(12) United States Patent  
Park et al.

(10) Patent No.: US 11,605,829 B2  
(45) Date of Patent: Mar. 14, 2023

(54) ION EXCHANGE MEMBRANE AND ENERGY STORAGE DEVICE COMPRISING SAME

(71) Applicant: Kolon Industries, Inc., Seoul (KR)

(72) Inventors: Junghwa Park, Seoul (KR); Donghoon Lee, Seoul (KR); Nayoung Kim, Seoul (KR); Eunsu Lee, Seoul (KR); Seungjib Yum, Seoul (KR)

(73) Assignee: Kolon Industries, Inc., Seoul (KR)

( * ) Notice: Subject to any disclaimer, the term of this patent is extended or adjusted under 35 U.S.C. 154(b) by 0 days.

(21) Appl. No.: 16/970,807

(22) PCT Filed: Feb. 26, 2019

(86) PCT No.: PCT/KR2019/002318  
§ 371 (c)(1),  
(2) Date: Aug. 18, 2020

(87) PCT Pub. No.: WO2019/168321  
PCT Pub. Date: Sep. 6, 2019

(65) Prior Publication Data  
US 2021/0111424 A1    Apr. 15, 2021

(30) Foreign Application Priority Data

Feb. 28, 2018 (KR) .......................... 10-2018-0024716  
Feb. 28, 2018 (KR) .......................... 10-2018-0024717

(51) Int. Cl.  
*H01M 8/10* (2016.01)  
*H01M 8/1051* (2016.01)  
(Continued)

(52) U.S. Cl.  
CPC ....... *H01M 8/1051* (2013.01); *H01M 8/1053* (2013.01); *H01M 8/1058* (2013.01); *H01M 8/1067* (2013.01); *H01M 8/18* (2013.01)

(58) Field of Classification Search  
CPC ............ H01M 8/1053; H01M 8/1051; H01M 8/1058; H01M 8/1067; H01M 8/18  
See application file for complete search history.

(56) References Cited

U.S. PATENT DOCUMENTS

| | | | | |
|---|---|---|---|---|
| 5,716,527 | A | * | 2/1998 | Deckman ............. B01J 37/0244 210/651 |
| 2003/0194598 | A1 | * | 10/2003 | Chan ................... H01M 4/8807 429/524 |

(Continued)

FOREIGN PATENT DOCUMENTS

| | | | |
|---|---|---|---|
| EP | 2205527 B1 | | 1/2017 |
| EP | 3352902 | * | 8/2018 |

(Continued)

OTHER PUBLICATIONS

JP Office Action dated Sep. 2, 2021.

(Continued)

*Primary Examiner* — Olatunji A Godo  
(74) *Attorney, Agent, or Firm* — Harvest IP Law LLP

(57) ABSTRACT

The present invention relates to an ion exchange membrane and an energy storage device comprising same, wherein the ion exchange membrane comprises: a polymer membrane comprising an ion conductor; and any one ion permeation inhibiting additive selected from the group consisting of a columnar porous metal oxide, crown ether, a nitrogen-containing cyclic compound, and a mixture thereof. In the ion exchange membrane, the size of a channel through which ions permeate is limited or an additive capable of trapping ions is introduced into an ion movement path, so that the permeation of ions is prevented, leading to the improvement of voltage efficiency and the prevention of deterioration.

18 Claims, 3 Drawing Sheets

(51) Int. Cl.
    *H01M 8/1053* (2016.01)
    *H01M 8/1058* (2016.01)
    *H01M 8/1067* (2016.01)
    *H01M 8/18* (2006.01)

(56) References Cited

U.S. PATENT DOCUMENTS

| | | | |
|---|---|---|---|
| 2007/0092776 A1 | 4/2007 | Akiyama et al. | |
| 2009/0087715 A1 | 4/2009 | Jang | |
| 2014/0120431 A1* | 5/2014 | Roelofs | H01M 8/103 429/408 |
| 2014/0154594 A1* | 6/2014 | Lee | C08J 5/2206 429/408 |
| 2015/0044537 A1 | 2/2015 | Dong | |
| 2016/0204408 A1* | 7/2016 | Herle | H01M 10/0525 429/143 |
| 2017/0125832 A1* | 5/2017 | Umeda | H01M 8/1046 |

FOREIGN PATENT DOCUMENTS

| | | |
|---|---|---|
| JP | 2005-146176 A | 6/2005 |
| JP | 2008130460 A | 6/2008 |
| JP | 2016192294 A | 11/2016 |
| KR | 10-2005-0119366 A | 12/2005 |
| KR | 10-2008-0103241 A | 11/2008 |
| KR | 10-2013-0013747 A | 2/2013 |
| WO | 2015119272 A1 | 8/2015 |
| WO | 2015/174593 A1 | 11/2015 |
| WO | WO2017050749 * | 3/2017 |

OTHER PUBLICATIONS

International Search Report for PCT/KR2019/002318, dated Jun. 17, 2019.
"Silicalite, a new hydrophobic crystalline silica molecular sieve . . . " Flanigen E.M. et al.
EP search report dated Jan. 7, 2022.

* cited by examiner

ION EXCHANGE MEMBRANE AND ENERGY STORAGE DEVICE COMPRISING SAME

CROSS REFERENCE TO RELATED APPLICATIONS

This application is a National Stage of International Application No. PCT/KR2019/002318 filed Feb. 26, 2019, claiming priority based on Korean Patent Application No. 10-2018-0024716 filed Feb. 28, 2018 and Korean Patent Application No. 10-2018-0024717 filed Feb. 28, 2018.

TECHNICAL FIELD

The present disclosure relates to an ion exchange membrane and an energy storage device including the same, and more particularly to an ion exchange membrane including an additive capable of limiting the size of a channel through which ions permeate or capturing ions on a path along which the ions move, whereby permeation of the ions is prevented, and therefore voltage efficiency is improved and degradation is prevented, a method of manufacturing the same, and an energy storage device including the same.

BACKGROUND ART

In order to solve problems related to depletion of fossil fuels and environmental pollution, efforts have been made to improve efficiency in use, thereby conserving fossil fuels, and to apply renewable energy to a wide variety of fields.

Renewable energy, such as solar energy and wind energy, has been used more efficiently than before; however, these energy sources are intermittent and unpredictable. Due to such characteristics thereof, reliance on these energy sources is limited, and the ratio of renewable energy to primary power sources is very low up to now.

A rechargeable battery enables the provision of a simple and efficient electricity storage method, and therefore efforts have been continuously made to miniaturize the rechargeable battery such that mobility of the rechargeable battery is improved, whereby the rechargeable battery is capable of being used as an intermittent auxiliary power source or a power source for small-sized electric home appliances, such as laptop computers, tablet PCs, and mobile phones.

A redox flow battery (RFB) is a secondary battery capable of storing and using energy for a long time as the result of repeated charging and discharging according to an electrochemical reversible reaction of an electrolyte. A stack and an electrolyte tank, each of which exerts an influence upon the capacity and output characteristics of the battery, are independently provided, whereby battery design is free and installation space limitation is low.

In addition, the redox flow battery is installed in a power plant, a power system, or a building, and has a load equalization function capable of adapting to an abrupt increase in power demand and a function of compensating for or inhibiting power failure or instantaneous low voltage. The redox flow battery is capable of being freely combined as needed, and therefore the redox flow battery is very powerful energy storage technology and a system suitable for large-scale energy storage.

The redox flow battery generally includes two separate electrolytes. One of the electrolytes stores an electrically active material in a negative electrode reaction, and the other is used in a positive electrode reaction. Actually, the reaction of the electrolyte in a positive electrode of the redox flow battery and the reaction of the electrolyte in a negative electrode of the redox flow battery are different from each other, and an electrolyte flow phenomenon occurs, whereby a pressure difference between the positive electrode and the negative electrode occurs. In an all-vanadium redox flow battery, which is a typical redox flow battery, the reaction of the electrolyte at the positive electrode and the reaction of the electrolyte at the negative electrode occur as represented by Reaction Equation 1 and Reaction Equation 2, respectively.

[Reaction Equation 1]

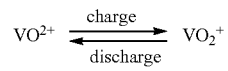

[Reaction Equation 2]

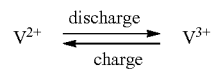

Consequently, an ion exchange membrane having improved physical and chemical durability is necessary to overcome the pressure difference between both electrodes and to exhibit excellent battery performance in spite of repeated charging and discharging. In the redox flow battery, the ion exchange membrane is a core material that occupies cost equivalent to about 10% that of a system.

Since, in the redox flow battery, the ion exchange membrane is a core material that affects the lifespan and cost of the battery, as described above, selective ion permeability of the ion exchange membrane must be high and thus crossover of vanadium ions must be low in order to commercialize the redox flow battery. In addition, electrical resistance of the ion exchange membrane must be low and thus ion conductivity must be high. Furthermore, the ion exchange membrane must be mechanically and chemically stable, and therefore durability of the ion exchange membrane must be high. Moreover, the ion exchange membrane must be inexpensive.

Meanwhile, a polymer electrolyte membrane currently commercialized as an ion exchange membrane has been used for several decades and has also been steadily researched. In recent years, much research has also been conducted into an ion exchange membrane used as a medium capable of transmitting ions in a direct methanol fuel cell (DMFC), a polymer electrolyte membrane fuel cell (PEMFC) (proton exchange membrane fuel cell), a redox flow battery, a water purification apparatus, etc.

Among the materials currently widely used as an ion exchange membrane is a Nafion™-based membrane from DuPont in USA, which is a polymer containing a perfluorosulfonic acid group. When having saturated moisture content, this membrane exhibits ion conductivity of 0.08 S/cm and high mechanical strength and chemical resistance at normal temperature, and has stable performance as an electrolyte membrane sufficient to be used in a fuel cell for vehicles. In addition, there are Aciplex-S membrane from Asahi Chemicals, Dow membrane from Dow Chemicals, Flemion membrane from Asahi Glass, and GoreSelect from Gore & Associate as commercial membranes similar thereto. Ballard Power System in Canada is also researching and developing a perfluorinated polymer in an alpha or beta form.

However, the above membranes are expensive, and synthesis methods are complicated, whereby mass production is difficult. Furthermore, in an electric energy system, such as a redox flow battery, a crossover phenomenon occurs and ion conductivity at high temperature or low temperature is low, and therefore efficiency as an ion exchange membrane is greatly reduced.

DISCLOSURE

Technical Problem

It is an object of the present disclosure to provide an ion exchange membrane including an additive capable of limiting the size of a channel through which ions permeate or capturing ions on a path along which the ions move, whereby permeation of the ions is prevented, and therefore voltage efficiency is improved and degradation is prevented.

It is another object of the present disclosure to provide an energy storage device including the ion exchange membrane.

Technical Solution

In accordance with an aspect of the present disclosure, there is provided an ion exchange membrane including a polymer membrane including an ion conductor and an ion-permeation preventing additive which is any one selected from the group consisting of a columnar porous metal oxide, a crown ether, a nitrogen-containing cyclic compound, and a mixture thereof.

The columnar porous metal oxide may be a porous metal oxide having a columnar shape and including a plurality of pores extending in the height direction of the column and penetrating the column.

The columnar porous metal oxide may have a pore size of 0.35 nm to 1.2 nm.

The columnar porous metal oxide may have a height of 3 nm to 200 nm.

The columnar porous metal oxide may have an aspect ratio of 1:0.1 to 1:1.

The columnar porous metal oxide may be any one selected from the group consisting of silica, organic silica, a metal oxide other than silica, and a complex of silica and a metal oxide other than silica.

The columnar porous metal oxide may have a hexagonal prismatic shape in which a plurality of pores is arranged in a hexagonal shape when viewed in a sectional view in a direction perpendicular to the height direction of the column.

The porous metal oxide of hexagonal prismatic shape may have a hexagonal electron diffraction pattern, a $d_{100}$ value of which is 18 Å or more, and may have a benzene adsorption capacity (@ 50 torr, 25° C.) of 15 g/100 g (grams of benzene/grams of porous metal oxide) or more.

The ion exchange membrane may include the columnar porous metal oxide in an amount of 0.01 parts by weight to 0.50 parts by weight based on 1 part by weight of the ion conductor.

The crown ether may be any one selected from the group consisting of 12-crown-4, 15-crown-5, 18-crown-6, dibenzo-18-crown-6, diaza-18-crown-6, and a mixture thereof.

The nitrogen-containing cyclic compound may be any one selected from the group consisting of pyrrole, thiazole, isothiazole, oxazole, isoxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine, indoline, and a mixture thereof.

The ion exchange membrane may include the crown ether or the nitrogen-containing cyclic compound in an amount of 0.001 parts by weight to 0.20 parts by weight based on 1 part by weight of the ion conductor.

The ion-permeation preventing additive may be dispersed in the polymer membrane in the state of being mixed with the ion conductor.

The ion exchange membrane may comprise the polymer membrane including the ion conductor and a coating layer located on one surface or opposite surfaces of the polymer membrane, the coating layer including the ion-permeation preventing additive.

The coating layer including the ion-permeation preventing additive may be provided in an amount of 0.05 parts by volume to 1.0 part by volume based on 1 part by volume of the polymer membrane.

The ion exchange membrane may be a stack of first and second polymer membranes, the first polymer membrane including the ion conductor, the second polymer membrane including the ion conductor and the ion-permeation preventing additive dispersed therein in the state of being mixed with the ion conductor.

The second polymer membrane may be provided in an amount of 0.05 parts by volume to 1.0 part by volume based on 1 part by volume of the first polymer membrane.

The polymer membrane may include a porous support including a plurality of pores and an ion conductor filling the pores of the porous support.

In accordance with another aspect of the present disclosure, there is provided an energy storage device including the ion exchange membrane.

The energy storage device may be a redox flow battery.

Advantageous Effects

An ion exchange membrane according to the present disclosure includes an additive capable of limiting the size of a channel through which ions permeate or capturing ions on a path along which the ions move, whereby permeation of the ions is prevented, and therefore voltage efficiency is improved and degradation is prevented.

BEST MODE

Figure 1:
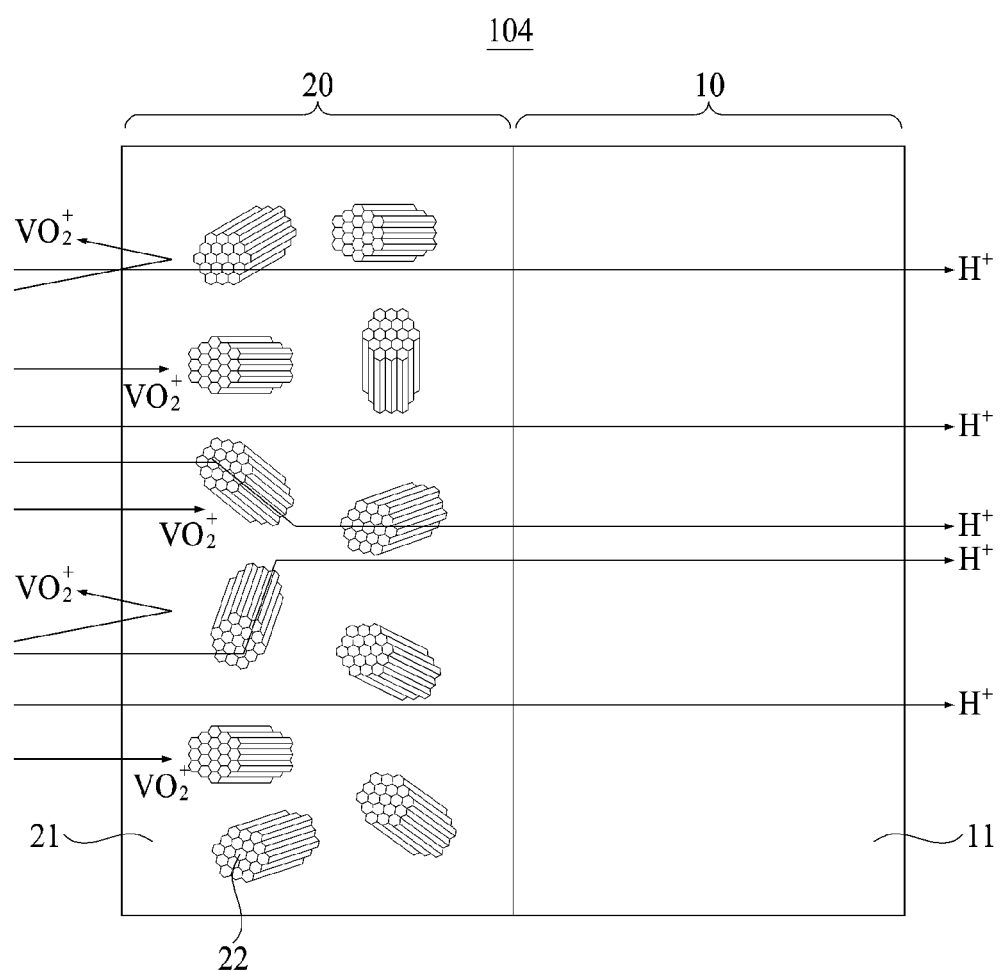
FIG. 1 is a view schematically showing an example of selective ion permeation in an ion exchange membrane having a form in which a first polymer membrane and a second polymer membrane are stacked.

Hereinafter, the present disclosure will be described in more detail.

Unless particularly noted otherwise in this specification, an alkyl group includes a primary alkyl group, a secondary alkyl group, and a tertiary alkyl group, each of which is a straight-chain or branched-chain alkyl group having a carbon number ranging from 1 to 10, an alkyl halide group is a straight-chain or branched-chain alkyl halide group having a carbon number ranging from 1 to 10, an allyl group is an allyl group having a carbon number ranging from 2 to 10, an aryl group is an aryl group having a carbon number ranging from 6 to 30, an alkoxy group is an alkoxy group having a carbon number ranging from 1 to 10, an alkyl sulfonyl group is an alkyl sulfonyl group having a carbon number ranging from 1 to 10, an acyl group is an acyl group having a carbon number ranging from 1 to 10, and an aldehyde group is an aldehyde group having a carbon number ranging from 1 to 10.

Unless particularly noted otherwise in this specification, an amino group includes a primary amino group, a secondary amino group, and a tertiary amino group, and the secondary amino group or the tertiary amino group is an amino group having a carbon number ranging from 1 to 10.

Unless particularly noted otherwise in this specification, all compounds or substituent groups may be substituted or unsubstituted. Here, "substituted" means that hydrogen is substituted by any one selected from the group consisting of a halogen atom, a hydroxy group, a carboxyl group, a cyano group, a nitro group, an amino group, a thio group, a methylthio group, an alkoxy group, a nitrile group, an aldehyde group, an epoxy group, an ether group, an ester group, an ester group, a carbonyl group, an acetal group, a ketone group, an alkyl group, a perfluoroalkyl group, a cycloalkyl group, a hetero-cycloalkyl group, an allyl group, a benzyl group, an aryl group, a heteroaryl group, a derivative thereof, and a combination thereof.

In this specification, * shown at opposite ends of a chemical formula indicates that the chemical moiety is connected to adjacent different chemical moieties.

In this specification, an ion conductor including a repeating unit expressed as a general formula may include not only a repeating unit expressed as a kind of chemical formula included in the general formula but also repeating units expressed as various kinds of chemical formulas included in the general formula.

An ion exchange membrane according to an embodiment of the present disclosure includes a polymer membrane including an ion conductor and an ion-permeation preventing additive selected from the group of a columnar porous metal oxide, a crown ether, a nitrogen-containing cyclic compound, and a mixture thereof.

The ion conductor may be a cation conductor having a cation-conducting group conducting, for example, protons, or an anion conductor having an anion-conducting group conducting, for example, hydroxyl ions, carbonate, or bicarbonate.

The cation-conducting group may be one selected from the group consisting of a sulfonic acid group, a carboxyl group, a boronic acid group, a phosphate group, an imide group, a sulfonimide group, a sulfonamide group, and a combination thereof. In general, the cation-conducting group may be a sulfonic acid group or a carboxyl group.

The cation conductor may include the cation-conducting group, and may be a fluorine-based polymer including fluorine in the main chain thereof; a hydrocarbon-based polymer, such as benzimidazole, polyamide, polyamide imide, polyimide, polyacetal, polyethylene, polypropylene, acrylic resin, polyester, polysulfone, polyether, polyether imide, polyester, polyether sulfone, polyether imide, polycarbonate, polystyrene, polyphenylene sulfide, polyether ether ketone, polyether ketone, polyaryl ether sulfone, polyphosphazene, or polyphenyl quinoxaline; a partially fluorinated polymer, such as a polystyrene-graft-ethylene tetrafluoroethylene copolymer or a polystyrene-graft-polytetrafluoroethylene copolymer; or sulfone imide.

More specifically, in the case in which the cation conductor is a proton conductor, the polymer may include a side-chain cation-conducting group selected from the group consisting of a sulfonic acid group, a carboxyl acid group, a phosphate group, a phosphonic acid group, and a derivative thereof, and concrete examples of the polymer may include, but are not limited to, a fluorine-based polymer including poly(perfluorosulfonic acid), poly(perfluorocarboxylic acid), a copolymer of tetrafluoroethylene and fluoro vinyl ether including a sulfonic acid group, defluorinated polyetherketone sulfide, and a mixture thereof; and a hydrocarbon-based polymer including sulfonated polyimide (S-PI), sulfonated polyarylether sulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, and a mixture thereof.

The anion conductor is a polymer capable of transporting anions, such as hydroxyl ions, carbonate, or bicarbonate. The anion conductor is commercially available in the form of hydroxide or halide (generally chloride), and the anion conductor may be used in an industrial water purification, metal separation, or catalyst process.

A polymer doped with metal hydroxide may be generally used as the anion conductor. Specifically, poly(ether sulfone), polystyrene, a vinyl-based polymer, poly(vinyl chloride), poly(vinylidene fluoride), poly(tetrafluoroethylene), poly(benzimidazole), or poly(ethylene glycol), doped with metal hydroxide, may be generally used as the anion conductor.

As an example, the ion conductor may be a hydrocarbon-based polymer including a hydrophilic repeating unit and a hydrophobic repeating unit.

At least one monomer constituting the hydrophilic repeating unit may be substituted by the ion-conducting group, and monomers constituting the hydrophobic repeating unit may not be substituted by the ion-conducting groups, or may be substituted by a smaller number of ion-conducting groups than the case of the hydrophilic repeating unit. In addition, the hydrophilic repeating unit may include a monomer substituted by the ion-conducting group and a monomer not substituted by the ion-conducting group, although all monomers constituting the hydrophilic repeating unit may include the ion-conducting groups.

The ion conductor may be a random copolymer in which the hydrophilic repeating unit and the hydrophobic repeating unit are connected to each other at random, or may be a block copolymer including hydrophilic blocks constituted by the hydrophilic repeating units and hydrophobic blocks constituted by the hydrophobic repeating units.

More specifically, the ion conductor may include a monomer in which the hydrophilic repeating unit is expressed by Chemical Formula 2 below.

[Chemical Formula 2]

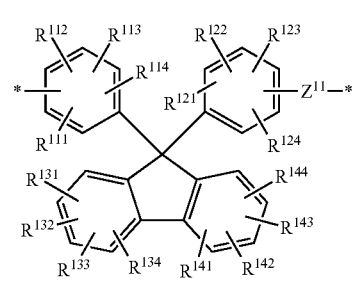

In Chemical Formula 2 above, each of $R^{111}$ to $R^{114}$, $R^{121}$ to $R^{124}$, $R^{131}$ to $R^{134}$, and $R^{141}$ to $R^{144}$ may be one selected from the group consisting of a hydrogen atom, a halogen atom, an ion-conducting group, an electron-donating group, and an electron-withdrawing group.

The halogen atom may be one selected from the group consisting of bromine, fluorine, and chlorine.

The ion-conducting group may be a cation-conducting group selected from the group consisting of a sulfonic acid group, a carboxyl acid group, and a phosphate group, as described above. Preferably, the cation-conducting group is a sulfonic acid group. In addition, the ion-conducting group may be an anion-conducting group such as an amine group.

In addition, the electron-donating group, which is an organic group that donates electrons, may be one selected from the group consisting of an alkyl group, an allyl group, an aryl group, an amino group, a hydroxyl group, and an alkoxy group, and the electron-withdrawing group, which is an organic group that withdraws electrons, may be one selected from the group consisting of an alkyl sulfonyl group, an acyl group, an alkyl halide group, an aldehyde group, a nitro group, a nitroso group, and a nitrile group.

The alkyl group may be a methyl group, an ethyl group, a propyl group, a butyl group, an isobutyl group, an amyl group, a hexyl group, a cyclohexyl group, or an octyl group. The alkyl halide group may be a trifluoromethyl group, a pentafluoroethyl group, a perfluoropropyl group, a perfluorobutyl group, a perfluoropentyl group, or a perfluorohexyl group. The allyl group may be a propenyl group. The aryl group may be a phenyl group or a pentafluorophenyl group. The perfluoroalkyl group may be an alkyl group in which some hydrogen atoms or all hydrogen atoms are substituted by fluorine.

$Z^{11}$, which is a bivalent organic group, may be —O— or —S—, preferably —O—.

At this time, in order for the repeating unit including the monomer expressed by Chemical Formula 2 above to become the hydrophilic repeating unit, at least one of $R^{111}$ to $R^{114}$, $R^{121}$ to $R^{124}$, $R^{131}$ to $R^{134}$, or $R^{141}$ to $R^{144}$, in the monomer expressed by Chemical Formula 2 above, may be an ion-conducting group.

Specifically, the hydrophilic repeating unit may be expressed by Chemical Formula 2-1 or Chemical Formula 2-2 below.

group, an alkyl halide group, an aldehyde group, a nitro group, a nitroso group, and a nitrile group. A detailed description of the substituent groups is the same as the above description, and therefore a duplicate description thereof will be omitted.

Each of $X^{21}$ and $X^{22}$ may be a single bond or a bivalent organic group. The bivalent organic group is a bivalent organic group that withdraws or donates electrons. Specifically, the bivalent organic group may be one selected from the group consisting of —CO—, —SO$_2$—, —CONH—, —COO—, —CR'$_2$—, —C(CH$_3$)$_2$—, —C(CF$_3$)$_2$—, and —(CH$_2$)$_n$—. At this time, R' may be one selected from the group consisting of a hydrogen atom, a halogen atom, an alkyl group, and an alkyl halide group, and n may be an integer ranging from 1 to 10. In the case in which $X^{21}$ or $X^{22}$ is a single bond, phenyl groups existing at opposite sides of X are directly connected thereto, and a typical example thereof may be a biphenyl group.

$Z^{21}$, which is a bivalent organic group, may be —O— or —S—, preferably —O—.

[Chemical Formula 2-2]

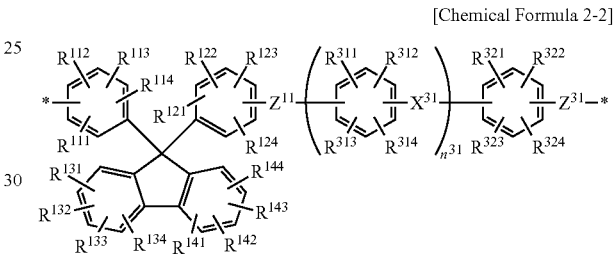

In Chemical Formula 2-2 above, a detailed description of $R^{111}$ to $R^{114}$, $R^{121}$ to $R^{124}$, $R^{131}$ to $R^{134}$, $R^{141}$ to $R^{144}$, and $Z^{11}$ is the same as the above description, and therefore a duplicate description thereof will be omitted.

Each of $R^{311}$ to $R^{314}$ and $R^{321}$ to $R^{324}$ may be one selected from the group consisting of a hydrogen atom; a halogen atom; an ion-conducting group; an electron-donating group selected from the group consisting of an alkyl group, an allyl

[Chemical Formula 2-1]

In Chemical Formula 2-1 above, a detailed description of $R^{111}$ to $R^{114}$, $R^{121}$ to $R^{124}$, $R^{131}$ to $R^{134}$, $R^{141}$ to $R^{144}$, and $Z^{11}$ is the same as the above description, and therefore a duplicate description thereof will be omitted.

Each of $R^{211}$ to $R^{214}$, $R^{221}$ to $R^{224}$, and $R^{231}$ to $R^{234}$ may be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. A detailed description of the substituent groups is the same as the above description, and therefore a duplicate description thereof will be omitted.

$X^{31}$ may be a single bond or a bivalent organic group selected from the group consisting of —CO—, —SO$_2$—, —CONH—, —COO—, —CR'$_2$—, —(CH$_2$)$_n$—, a cyclohexylidene group, a cyclohexylidene group including an ion-conducting group, a fluorenylidene group, a fluorenylidene group including an ion-conducting group, —C(CH$_3$)$_2$—, —C(CF$_3$)$_2$—, —O—, and —S—. R' may be one selected from the group consisting of a hydrogen atom, a halogen atom, an alkyl group, and an alkyl halide group, and n may be an integer ranging from 1 to 10. A detailed description of the substituent groups is the same as the above description, and therefore a duplicate description thereof will be omitted.

Meanwhile, the cyclohexylidene group including the ion-conducting group or the fluorenylidene group including the ion-conducting group is a cyclohexylidene group or a fluorenylidene group, the hydrogen of which is substituted by an ion-conducting group selected from the group consisting of a sulfonic acid group, a carboxyl acid group, a phosphate group, and a combination thereof.

$Z^{31}$, which is a bivalent organic group, may be —O— or —S—, preferably —O—.

$n^{31}$ may be an integer ranging from 1 to 10, preferably 0 or 1.

Meanwhile, the ion conductor may include a monomer, the hydrophobic repeating unit of which is expressed by Chemical Formula 3.

[Chemical Formula 3]

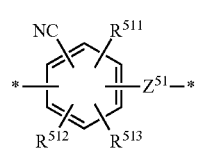

In Chemical Formula 3 above, a detailed description of $R^{211}$ to $R^{214}$, $R^{221}$ to $R^{224}$, $R^{231}$ to $R^{234}$, $X^{21}$, $X^{22}$, and $Z^{21}$ is the same as the above description, and therefore a duplicate description thereof will be omitted.

Specifically, the hydrophobic repeating unit may be expressed by Chemical Formula 3-1 below.

[Chemical Formula 3-1]

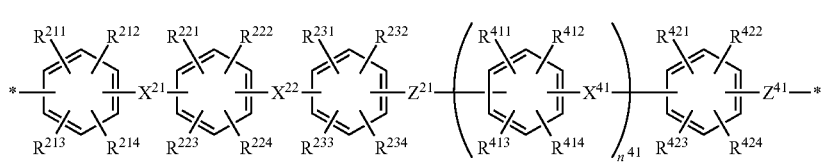

In Chemical Formula 3-1 above, a detailed description of $R^{211}$ to $R^{214}$, $R^{221}$ to $R^{224}$, $R^{231}$ to $R^{234}$, $X^{21}$, $X^{22}$, and $Z^{21}$ is the same as the above description, and therefore a duplicate description thereof will be omitted.

Each of $R^{411}$ to $R^{414}$ and $R^{421}$ to $R^{424}$ may be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. A detailed description of the substituent groups is the same as the above description, and therefore a duplicate description thereof will be omitted.

$X^{41}$ may be a single bond or a bivalent organic group selected from the group consisting of —CO—, —SO$_2^-$, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O—, and —S—. R' may be one selected from the group consisting of a hydrogen atom, a halogen atom, an alkyl group, and an alkyl halide group, and n may be an integer ranging from 1 to 10. A detailed description of the substituent groups is the same as the above description, and therefore a duplicate description thereof will be omitted.

$Z^{41}$, which is a bivalent organic group, may be —O— or —S—, preferably —O—.

$n^{41}$ may be an integer ranging from 1 to 10, preferably 0 or 1.

In addition, the ion conductor may include a monomer, the hydrophobic repeating unit of which is expressed by Chemical Formula 4 below.

[Chemical Formula 4]

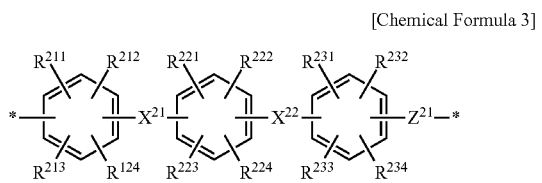

In Chemical Formula 4 above, each of $R^{511}$ to $R^{513}$ may be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. A detailed description of the substituent groups is the same as the above description, and therefore a duplicate description thereof will be omitted.

$Z^{51}$, which is a bivalent organic group, may be —O— or —S—, preferably —O—.

Specifically, the hydrophobic repeating unit may be expressed by Chemical Formula 4-1 below.

[Chemical Formula 4-1]

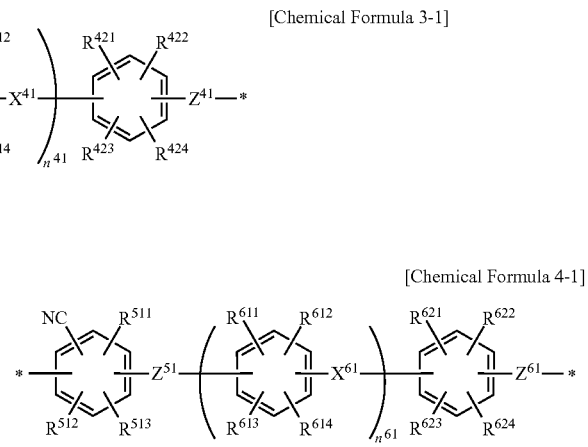

In Chemical Formula 4-1 above, a detailed description of $R^{511}$ to $R^{513}$ and $Z^{51}$ is the same as the above description, and therefore a duplicate description thereof will be omitted.

Each of $R^{611}$ to $R^{614}$ and $R^{621}$ to $R^{624}$ may be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. A detailed description of the substituent groups is the same as the above description, and therefore a duplicate description thereof will be omitted.

$X^{61}$ may be a single bond or a bivalent organic group selected from the group consisting of —CO—, —$SO_2^-$—, —CONH—, —COO—, —$CR'_2$—, —$(CH_2)_n$—, a cyclohexylidene group, a fluorenylidene group, —$C(CH_3)_2$—, —$C(CF_3)_2$—, —O—, and —S—. R' may be one selected from the group consisting of a hydrogen atom, a halogen atom, an alkyl group, and an alkyl halide group, and n may be an integer ranging from 1 to 10. A detailed description of the substituent groups is the same as the above description, and therefore a duplicate description thereof will be omitted.

$Z^{61}$, which is a bivalent organic group, may be —O— or —S—, preferably —O—.

$n^{61}$ may be an integer ranging from 1 to 10, preferably 0 or 1.

Meanwhile, the ion conductor may include a monomer, the hydrophobic repeating unit of which is expressed by Chemical Formula 5-1 below.

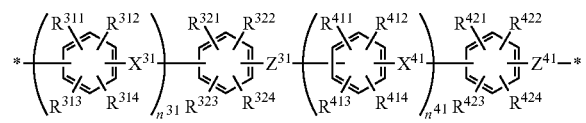

[Chemical Formula 5-1]

In Chemical Formula 5-1 above, a detailed description of $R^{311}$ to $R^{314}$, $R^{321}$ to $R^{324}$, $R^{411}$ to $R^{414}$, $R^{421}$ to $R^{424}$, $X^{31}$, $X^{41}$, $Z^{31}$, $Z^{41}$, $n^{31}$, and $n^{41}$ is the same as the above description, and therefore a duplicate description thereof will be omitted. At this time, however, $X^{31}$ and $X^{41}$ may be different from each other.

In order for the repeating unit expressed by Chemical Formula 3-1, Chemical Formula 4-1, and Chemical Formula 5-1 to become the hydrophobic repeating unit, it is preferable for $R^{211}$ to $R^{214}$, $R^{221}$ to $R^{224}$, $R^{231}$ to $R^{234}$, $R^{311}$ to $R^{314}$, $R^{321}$ to $R^{324}$, $R^{411}$ to $R^{414}$, $R^{421}$ to $R^{424}$, $R^{511}$ to $R^{513}$, $R^{611}$ to $R^{614}$, and $R^{621}$ to $R^{624}$, in the repeating unit expressed by Chemical Formula 3-1, Chemical Formula 4-1, and Chemical Formula 5-1, to substantially include no ion-conducting groups. Here, "substantially include no ion-conducting groups" means that the substituent groups may include a small number of ion-conducting groups; however, the number of ion-conducting groups does not affect phase separation between a hydrophilic region and a hydrophobic region.

Meanwhile, the ion conductor may further include a monomer, the hydrophilic repeating unit or the hydrophobic repeating unit of which is expressed by Chemical Formula 6 below.

In the case in which the ion conductor further includes a monomer expressed by Chemical Formula 6 below, the ion conductor includes a nitrogen-containing aromatic ring group in the main chain thereof, whereby durability against radical attack and acid-base interaction are improved. In the ion conductor, therefore, a phenomenon in which an addition reaction occurs in the aromatic ring of the ion exchange membrane or the aromatic ring of the ion exchange membrane is cut as the result of the attack of radicals formed at a cathode does not occur. In addition, the function of the ion-conducting group is maximized, whereby operation performance in a low-humidity state may be improved.

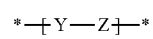

[Chemical Formula 6]

In Chemical Formula 6 above, Z may be —O— or —S—, preferably —O—.

Y is a bivalent nitrogen-containing aromatic ring group. The nitrogen-containing aromatic ring group is a group in which at least one nitrogen atom, as a hetero atom, is included in the aromatic ring. In addition, an oxygen atom and a sulfur atom may be included as other hetero atoms, in addition to the nitrogen atom.

Specifically, the bivalent nitrogen-containing aromatic ring group may be a bivalent group of one nitrogen-containing aromatic ring compound selected from the group consisting of pyrrole, thiazole, isothiazole, oxazole, isoxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine, and indoline.

The ion conductor may have a weight average molecular weight of 10,000 g/mol to 1,000,000 g/mol, preferably 100,000 g/mol to 500,000 g/mol. In the case in which the weight average molecular weight of the ion conductor is less than 100,000 g/mol, it may be difficult to form a uniform membrane, and the durability of the membrane may be reduced. In the case in which the weight average molecular weight of the ion conductor is greater than 500,000 g/mol, solubility may be reduced.

The hydrophilic repeating unit and the hydrophobic repeating unit may be individually manufactured, and then nucleophilic substitution reaction may be performed in the hydrophilic repeating unit and the hydrophobic repeating unit in order to manufacture the ion conductor.

In addition, the hydrophilic repeating unit and the hydrophobic repeating unit may also be manufactured through a nucleophilic substitution reaction. For example, in the case in which the hydrophilic repeating unit is a repeating unit expressed by Chemical Formula 2-2 above, the hydrophilic repeating unit may be manufactured through aromatic nucleophilic substitution reaction of an active dihalide monomer and an active dihydroxy monomer, which are two ingredients constituting the repeating unit expressed by Chemical Formula 2-2 above. In the case in which the hydrophobic repeating unit is a repeating unit expressed by Chemical Formula 3-1 above, the hydrophobic repeating unit may be manufactured through an aromatic nucleophilic substitution reaction of an active dihalide monomer and an active dihydroxy monomer, which are two ingredients constituting the repeating unit expressed by Chemical Formula 3-1 above.

As an example, in the case in which the hydrophilic repeating unit is a repeating unit expressed by Chemical Formula 2-2 above, the hydrophilic repeating unit may be manufactured through a nucleophilic substitution reaction of SDCDPS (sulfonated dichlorodiphenyl sulfone), SDFDPS (sulfonated difluorodiphenyl sulfone), SDCDPK (sulfonated dichlorodiphenyl ketone), DCDPS (dichlorodiphenyl sulfone), DFDPS (difluorodiphenyl sulfone or bis-(4-fluorophenyl)-sulfone), or DCDPK (dichlorodiphenyl ketone), as the active dihalide monomer, and SHPF (sulfonated 9,9'-bis(4-hydroxyphenyl)fluorine or sulfonated 4,4'-(9-Fluorenylidene biphenol)) or HPF (9,9'-bis(4-hydroxyphenyl)fluorine or 4,4'-(9-fluorenylidene biphenol)), as the active dihydroxy monomer.

In addition, in the case in which the hydrophobic repeating unit is a repeating unit expressed by Chemical Formula 3-1 above, the hydrophobic repeating unit may be manufactured through a nucleophilic substitution reaction of 1,3-bis(4-fluorobenzoyl)benzene, as the active dihalide monomer, and DHDPS (dihydroxydiphenyl sulfone), DHDPK (dihydroxydiphenyl ketone or dihydroxybenzophenone), or BP (4,4'-biphenol), as the active dihydroxy monomer.

In addition, in the case in which the hydrophobic repeating unit is a repeating unit expressed by Chemical Formula 4-1 above, the hydrophobic repeating unit may be manufactured through a nucleophilic substitution reaction of 2,6-difluorobenzonitrile, as the active dihalide monomer, and DHDPS (dihydroxydiphenyl sulfone), DHDPK (dihydroxydiphenyl ketone or dihydroxybenzophenone), or BP (4,4'-biphenol), as the active dihydroxy monomer.

In the same manner, even in the case in which a nucleophilic substitution reaction is performed between the manufactured hydrophilic repeating unit and the manufactured hydrophobic repeating unit, control may be performed such that opposite ends of the hydrophilic repeating unit are hydroxyl groups and the opposite ends of the hydrophobic repeating unit are halide groups, or control may be performed such that opposite ends of the hydrophobic repeating unit are hydroxyl groups and the opposite ends of the hydrophilic repeating unit are halide groups, whereby a nucleophilic substitution reaction may be performed between the hydrophilic repeating unit and the hydrophobic repeating unit.

At this time, it is preferable to perform the nucleophilic substitution reaction in the presence of an alkaline compound. Specifically, the alkaline compound may be sodium hydroxide, potassium hydroxide, sodium carbonate, potassium carbonate, or sodium hydrogen carbonate, which may be used either alone or in combination of two or more thereof.

In addition, the nucleophilic substitution reaction may be performed in a solvent. Specifically, the solvent may be an aprotic polar solvent, such as N-dimethyl acetamide, N,N-dimethyl formamide, N-methyl-2-pyrrolidone, dimethyl sulfoxide, sulfolane, or 1,3-dimethyl-2-imidazolidinone, which may be used either alone or in combination of two or more thereof.

At this time, a solvent, such as benzene, toluene, xylene, hexane, cyclohexane, octane, chlorobenzene, dioxane, tetrahydrofuran, anisole, or phenetole, may coexist with the aprotic solvent.

Optionally, a step of introducing an ion-conducting group into the ion conductor may be further included. As an example, in the case in which the ion-conducting group is a sulfonic acid group, which is a cation-conducting group, the step of introducing the ion-conducting group into the ion conductor may be performed through the following two methods.

First, a method of performing polymerization using a monomer including an ion-conducting group at the time of manufacturing the hydrophilic repeating unit of the ion conductor such that the ion-conducting group is introduced into the manufactured polymer may be used. In this case, SDCDPS (sulfonated dichlorodiphenyl sulfone), SDFDPS (sulfonated difluorodiphenyl sulfone), SDCDPK (sulfonated dichlorodiphenyl ketone), or SHPF (sulfonated 9,9'-bis(4-hydroxyphenyl)fluorine or sulfonated 4,4'-(9-fluorenylidene biphenol)), which includes an ion-conducting group, may be used as the monomer for the nucleophilic substitution reaction.

Also, in this case, a method of reacting a monomer having a sulfonic acid ester group, instead of the sulfonic acid group, to manufacture the polymer having the sulfonic acid ester group and diesterifying the sulfonic acid ester group to convert the sulfonic acid ester group into a sulfonic acid group may also be used.

Second, a polymer may be manufactured using a monomer including no ion-conducting group, and then the polymer may be sulfonated using a sulfonation agent such that an ion-conducting group is introduced into the hydrophilic repeating unit.

Sulfuric acid may be used as the sulfonation agent. As another example, the manufactured polymer may be reacted in a chlorinated solvent, such as dichloromethane, chloroform, or 1,2-dichloroethane, in the presence of an excess of chlorosulfonic acid (1 to 10 times, preferably 4 to 7 times, the overall weight of the polymer) in order to manufacture an ion conductor exhibiting proton conductivity.

In the case in which the ion conductor includes a sulfonic acid group as an ion-conducting group, the degree of sulfonation of the ion conductor may range from 1 mole % to 100 mole %, preferably from 50 mole % to 100 mole %. That is, the ion conductor may be sulfonated 100 mole % at a site at which the ion conductor is capable of being sulfonated. Even in the case in which the ion conductor is sulfonated 100 mole %, the dimensional stability and durability of the ion conductor are not reduced due to the structure of the block copolymer of the ion conductor. In addition, when the degree of sulfonation of the ion conductor is within the above range, the ion conductor may exhibit high ion conductivity without a reduction in the dimensional stability thereof.

In the case in which the ion conductor includes the hydrophilic repeating unit and the hydrophobic repeating unit, the hydrophilic repeating unit and the hydrophobic repeating unit may be primarily synthesized in an oligomer state, and then the hydrophilic repeating unit and the hydrophobic repeating unit may be synthesized so as to have a desired molar ratio, whereby the structure of the ion conductor may be easily controlled and thus the properties of the ion conductor may be easily controlled. In the ion conductor, the structure of which is controlled as described above, micro-scale phase separation may be achieved between the hydrophilic repeating unit and the hydrophobic repeating unit, whereby it is possible to provide an ion conductor having improved ion conductivity and durability throughout an entire humidification range.

At this time, the molar ratio of the hydrophilic repeating unit to the hydrophobic repeating unit means the ratio of one mole of the hydrophilic repeating unit to the number of moles of the hydrophobic repeating unit included in the ion conductor. The molar ratio of the hydrophilic repeating unit to the hydrophobic repeating unit in the ion conductor may be 1:0.5 to 1:10, specifically 1:1 to 1:5, and more specifically 1:more than 1.2 to 1:5. In the case in which the molar percentage of the hydrophobic repeating unit is less than 0.5, the moisture content of the ion conductor may be increased, whereby the dimensional stability and durability of the ion conductor may be reduced. In the case in which the molar percentage of the hydrophobic repeating unit is greater than 10, the desired ion conductivity performance of the ion conductor may not be realized.

Meanwhile, the polymer membrane may be a single membrane constituted by the ion conductor or a reinforced membrane in which the ion conductor is supported by a porous support.

In the case in which the polymer membrane is a reinforced membrane, the polymer membrane may include a porous support including a plurality of pores and an ion conductor configured to fill the pores in the porous support.

As an illustration, the porous support may include a perfluorinated polymer having high resistance to thermal and chemical decomposition, preferably a perfluorinated polymer. For example, the porous support may be a copolymer of polytetrafluoroethylene (PTFE) or tetrafluoroethylene and $CF_2\!=\!CFC_nF_{2n+1}$ (n being an integer ranging from 1 to 5) or $CF_2\!=\!CFO\!-\!(CF_2CF(CF_3)O)_mC_nF_{2n+1}$ (m being an integer ranging from 0 to 15 and n being an integer ranging from 1 to 15).

The PTFE is commercially available, and may be appropriately used as the porous support. In addition, expanded polytetrafluoroethylene (e-PTFE), which has a polymer fibril microstructure or a microstructure in which nodes are connected to each other via fibrils, may also be appropriately used as the porous support, and a film having a polymer fibril microstructure in which no nodes are present may also be appropriately used as the porous support.

The porous support including the perfluorinated polymer is formed by extruding dispersion-polymerized PTFE onto tape in the presence of a lubricant and stretching the same. Consequently, it is possible to manufacture a porous support having higher porosity and higher strength. In addition, the e-PTFE may be thermally treated at a temperature exceeding the melting point (about 342° C.) of the PTFE, whereby it is possible to increase the amorphous content rate of PTFE. An e-PTFE film manufactured using the above method may have micropores having various diameters and porosities. The e-PTFE film manufactured using the above method may have a porosity of at least 35%, and the diameter of each of the micropores may be about 0.01 µm to 1 µm. In addition, the thickness of the porous support including the perfluorinated polymer may be variously changed. As an example, the thickness of the porous support may be 2 µm to 40 µm, preferably 5 µm to 20 µm. In the case in which the thickness of the porous support is less than 2 µm, the mechanical strength of the porous support may be remarkably reduced. In the case in which the thickness of the porous support is greater than 40 µm, on the other hand, the resistance loss of the porous support may be increased, and the light weight and integration of the porous support may be deteriorated.

As another illustration of the porous support, the porous support may be a nonwoven fibrous web including a plurality of fibers oriented at random.

The nonwoven fibrous web is a sheet that is interlaid but has a structure of individual fibers or filaments, rather than the same structure as woven cloth. The nonwoven fibrous web may be manufactured using a method selected from the group consisting of carding, garneting, air laying, wet laying, melt blowing, spun bonding, and stitch bonding.

The fiber may include one or more polymer materials. In general, any fiber-forming polymer material may be used. Specifically, a hydrocarbon-based fiber-forming polymer material may be used. For example, the fiber-forming polymer material may include, but is not limited to, polyolefin, such as polybutylene, polypropylene, or polyethylene; polyester, such as polyethylene terephthalate or polybutylene terephthalate; polyamide (nylon-6 or nylon-6,6); polyurethane; polybutene; polylactic acid; polyvinyl alcohol; polyphenylene sulfide; polysulfone; a liquid crystalline polymer; polyethylene-co-vinyl acetate; polyacrylonitrile; cyclic polyolefin; polyoxymethylene; a polyolefin-based thermoplastic elastomer; and a combination thereof.

As another illustration of the porous support having the form of the nonwoven fibrous web, the porous support may include a nanoweb in which nanofibers are integrated into the form of a nonwoven cloth including a plurality of pores.

A hydrocarbon-based polymer, which exhibits high chemical resistance and hydrophobicity, whereby the hydrocarbon-based polymer is prevented from being deformed by moisture in a high-humidity environment, is preferably used as the nanofibers. Specifically, the hydrocarbon-based polymer may be selected from the group consisting of nylon, polyimide, polyaramid, polyetherimide, polyacrylonitrile, polyaniline, polyethylene oxide, polyethylene naphthalate, polybutylene terephthalate, styrene-butadiene rubber, polystyrene, polyvinyl chloride, polyvinyl alcohol, polyvinylidene fluoride, polyvinyl butylene, polyurethane, polybenzoxazole, polybenzimidazole, polyamide imide, polyethylene terephthalate, polyphenylene sulfide, polyethylene, polypropylene, a copolymer thereof, and a mixture thereof. Thereamong, polyimide, which exhibits higher thermal resistance, chemical resistance, and shape stability, is preferably used.

The nanoweb is an aggregate of nanofibers in which nanofibers manufactured by electrospinning are arranged randomly. At this time, it is preferable for the nanofibers to have an average diameter of 40 nm to 5000 nm in consideration of the porosity and thickness of the nanoweb when the diameters of 50 fibers are measured using a scanning electron microscope (JSM6700F, JEOL) and the average of the diameters of the fibers is calculated. In the case in which the average diameter of the nanofibers is less than 40 nm, the mechanical strength of the porous support may be reduced. In the case in which the average diameter of the nanofibers is greater than 5000 nm, the porosity of the porous support may be remarkably deteriorated, and the thickness of the porous support may be increased.

The thickness of the nonwoven fibrous web may be 10 µm to 50 µm, specifically 15 µm to 43 µm. In the case in which the thickness of the nonwoven fibrous web is less than 10 µm, the mechanical strength of the nonwoven fibrous web may be reduced. In the case in which the thickness of the nonwoven fibrous web is greater than 50 µm, on the other hand, the resistance loss of the nonwoven fibrous web may be increased, and the light weight and integration of the nonwoven fibrous web may be deteriorated.

The basic weight of the nonwoven fibrous web may range from 5 $g/m^2$ to 30 $g/m^2$. In the case in which the basic weight of the nonwoven fibrous web is less than 5 $g/m^2$, visible pores are formed in the nonwoven fibrous web, whereby it may be difficult to realize the function as the porous support. In the case in which the basic weight of the nonwoven fibrous web is greater than 30 $g/m^2$, the nonwoven fibrous web may be manufactured in the form of paper or textile, which has few pores formed therein.

The porosity of the porous support may be 45% or more, specifically 60% or more. Meanwhile, it is preferable for the porous support to have a porosity of 90% or less. In the case in which the porosity of the porous support is greater than 90%, the shape stability of the porous support may be deteriorated, whereby subsequent processes may not be smoothly carried out. The porosity of the porous support may be calculated using Mathematical Expression 1 below based on the ratio of the volume of air to the overall volume of the porous support. At this time, the overall volume of the porous support may be calculated by manufacturing a rectangular sample and measuring the length, width, and thickness of the sample, and the volume of the air may be obtained by subtracting the volume of a polymer, back-calculated from the density thereof after measuring the mass of the sample, from the overall volume of the porous support.

Porosity (%)=(volume of air in porous support/
overall volume of porous
support)×100       [Mathematical Expression 1]

The ion exchange membrane is a reinforced composite-membrane-type ion exchange membrane in which the pores in the porous support are filled with an ion conductor.

In the case in which the polymer membrane is a reinforced membrane, the polymer membrane may further include an ion conductor layer located at one surface or opposite surfaces of the porous support. The ion conductor layer may be formed as the result of the pores in the porous support being filled with the ion conductor and the remainder of the ion conductor used to fill the pores in the porous support being coated on one surface or opposite surfaces of the porous support at the time of manufacture of the reinforced membrane type polymer membrane.

Also, in the case in which the ion conductor is a hydrocarbon-based copolymer including a hydrophilic repeating unit and a hydrophobic repeating unit, as illustrated above, it is advantageous to use a hydrocarbon-based porous support as the porous support in terms of the stability of the ion exchange membrane. Specifically, in the case in which a porous support and an ion conductor having different properties are combined, for example, in the case in which a fluorine-based porous support and a hydrocarbon-based ion conductor are combined, the ion conductor may be easily separated or discharged from the porous support, or impregnation efficiency may be reduced.

Meanwhile, the size of a hydronium ion formed while a hydrogen ion ($H^+$) permeates through the ion exchange membrane is about 320 μm, and the size of a pentavalent vanadium ion ($VO_2^+$), which affects polymer degradation and voltage efficiency, is about 1.15 nm. The size of an ion cluster formed during operation of a redox flow battery, is about 2 nm to 3 nm, which is a size efficient for the pentavalent vanadium ion as well as the hydronium ion to pass through the ion cluster. As a result, permeation of the vanadium ion occurs, whereby the ion exchange membrane is degraded and voltage efficiency is reduced.

Heretofore, the pentavalent vanadium ion has been described as an example of the ion which is likely to degrade the ion exchange membrane. However, the present disclosure is not limited thereto. For example, in addition to the pentavalent vanadium ion, one selected from the group consisting of $VO_2^+$, $Zn^{2+}$, $Zn^{3+}$, $Ce^{3+}$, $Ce^{4+}$, $Na^+$, $Fe^{3+}$, $Cr^{4+}$, and a mixture thereof, each of which permeates through the ion exchange membrane to reduce efficiency of a system into which the ion exchange membrane is introduced, may be an example of the ion which is likely to degrade the ion exchange membrane. The above-specified ions may be applied to a redox flow battery, and efficiency of the redox flow battery may be reduced when the ions permeates through the ion exchange membrane.

As an example, in the present disclosure, the size of a path through which the ions move may be limited using the columnar porous metal oxide, whereby it is possible to prevent ion permeation.

Specifically, the columnar porous metal oxide may have micropores having the size similar to that (1.15 nm) of the ions, in order to prevent permeation of the ions. Meanwhile, the size of the pores in the columnar porous metal oxide is greater than the size (<0.32 nm) of a proton or a hydronium ion supposed to be transmitted, thereby allowing selective permeation of the ion. Consequently, the pore size of the columnar porous metal oxide may be 0.35 nm to 1.2 nm, specifically 0.5 nm to 1 nm.

A porous metal oxide including any one selected from the group consisting of a silica-based metal oxide, such as silica or organic silica, a metal oxide other than silica, such as zirconia, alumina, titania, silica, or ceria, and a metal oxide-silica complex, such as zeolite, alumina-silica, titania-silica, or ceria-silica may be used as the columnar porous metal oxide having the above-specified pore size. The organic silica includes all kinds of silica in which an aliphatic compound or an aromatic compound is included in a repeating unit.

The pores in the columnar porous metal oxide may extend in the height direction of the column, and may be formed through the column. In the case in which the porous metal oxide has a columnar shape and includes a plurality of pores extending in the height direction of the column and formed through the column, as described above, the degree of ion permeation may be further adjusted depending on the disposition direction of the porous metal oxide. That is, in the case in which the columnar porous metal oxide is disposed such that the direction of the pores and the ion movement path do not coincide with each other, permeation of the ions may be further prevented. In the case in which the pores are formed in random directions, on the other hand, the above-described additional effects may not be obtained.

The columnar shape means a shape that is not a spherical shape, and any shape is possible as long as the shape has an edge between one plane and another plane. However, the plane is sufficient as long as the plane is substantially recognized as a plane although the plane is not a complete plane, and the edge is sufficient as long as the edge is substantially recognized as an edge although the edge is not completely angled but is rounded.

For example, the columnar shape may be one selected from the group consisting of a cylinder, a quadrangular prism, a pentagonal prism, a hexagonal prism, a heptagonal prism, an octagonal prism, and shapes similar thereto, is preferably a hexagonal prism. Here, a shape similar to the hexagonal prism means a shape that may be substantially recognized as a hexagonal prismatic shape as the case in which an upper surface, a lower surface, and six edges are observed although the shape is not a complete hexagonal prismatic shape.

The columnar porous metal oxide may have a height of 3 nm to 200 nm, specifically 4 nm to 50 nm. The height of the columnar shape means the length of the lateral surface thereof. In the case in which the height of the columnar shape is less than 3 nm, ion permeation may not be effectively prevented. In the case in which the height of the columnar shape is greater than 200 nm, the oxide in the ion exchange membrane acts as foreign matter, whereby the physical properties of the ion exchange membrane may be deteriorated.

The aspect ratio of the columnar porous metal oxide may be 1:0.1 to 1:1, specifically 1:0.5 to 1:1. In the case in which the aspect ratio of the columnar porous metal oxide is 1:less than 0.1, each of the pores may have no uniform structure.

The columnar porous metal oxide includes pores extending in the height direction of the column and formed through the column. The columnar porous metal oxide may include pores that extend in the direction perpendicular to the height direction of the column or are not formed through the column, in addition to the pores extending in the height direction of the column and formed through the column. However, the columnar porous metal oxide includes at least a plurality of pores extending in the height direction of the column and formed through the column.

In order for the pores not to allow the ions to pass therethrough and to allow the proton or the hydronium ion to selectively pass therethrough, the size of the pores may be 0.35 nm to 1.2 nm, specifically, 0.5 nm to 1 nm.

The columnar porous metal oxide may have the shape of a hexagonal prism in which a plurality of pores is arranged in a hexagonal shape when viewed in a sectional view in the direction perpendicular to the height direction of the column. That the pores are arranged in the hexagonal shape not only means mathematically perfect hexagonal symmetry but also includes things having deviation meaningfully observable from such an ideal state. For example, each of the pores arranged in the hexagonal shape may be surrounded by six neighboring pores the closest thereto. A considerable number of pores may violate such a standard depending on quality of the columnar porous metal oxide due to defects and imperfection at the time of manufacture. In the columnar porous metal oxide, therefore, the columnar shape may be included in the definition of the hexagonal prismatic shape as long as the number of pores each surrounded by six neighboring pores the closest thereto is 50% or more, specifically 75% or more, the total number of pores.

The columnar porous metal oxide in which the pores are arranged in the hexagonal shape shows an X-ray diffraction pattern having several distinct maximum values, and the position of the peaks approximately coincides with the position of hk0 reflection from a hexagonal lattice. In addition, the microstructure of the columnar porous metal oxide in which the pores are arranged in the hexagonal shape may be confirmed through electron diffraction using a scanning electron microscope. The columnar porous metal oxide in which the pores are arranged in the hexagonal shape shows hexagonal arrangement of large pores, and an electron diffraction pattern corresponding thereto shows hexagonal arrangement.

Specifically, a $d_{100}$ value of the electron diffraction pattern is the distance between adjacent spots in hk0 projection of a hexagonal lattice, and may be obtained from an equation $d_{100}=a_o\sqrt{(3/2)}$, where $a_o$ indicates the repeat distance between pores observed in an electron micrograph. Consequently, the columnar porous metal oxide in which the pores are arranged in the hexagonal shape, measured as described above, may have a hexagonal electron diffraction pattern, the $d_{100}$ value of which is 18 Å or more.

Also, the $d_{100}$ value of the electron diffraction pattern corresponds to d-spacing of a low angle peak in an X-ray diffraction pattern of a material, and the columnar porous metal oxide in which the pores are arranged in the hexagonal shape may have an X-ray diffraction pattern having two or more peaks at a position greater than 10 Å unit d-spacing (8.842 degrees two-theta for Cu K-alpha radiation). At least one of the two or more peaks may be located at a position greater than 18 Å unit d-spacing, and there may be no peak having relative intensity equivalent to about 20% or more the strongest peak at a position less than 10 Å unit d-spacing.

The X-ray diffraction data may be measured by a Scintag PAD X automatic diffraction system using theta geometry, Cu K-alpha radiation, and an energy dispersive X-ray detector. At this time, both incident light and diffracted X-ray light may be collimated by a dual slit incidence and diffraction collimation system. The slits have sizes of 0.5 mm, 1.0 mm, 0.3 mm, and 0.2 mm. In addition, the diffraction data may be recorded by step scanning at a 0.04 degree of 2θ. Here, θ is a Bragg angle, and count time for each step is 10 seconds.

In addition, the columnar porous metal oxide in which the pores are arranged in the hexagonal shape may have a benzene adsorption capacity (@ 50 torr, 25° C.) of 15 g/100 g (grams of benzene/grams of columnar porous metal oxide) or more. The benzene adsorption capacity may be the weight of adsorbed benzene measured after the columnar porous metal oxide in which the pores are arranged in the hexagonal shape is treated under conditions of 25° C. and 50 torr using benzene until the columnar porous metal oxide reaches equilibrium. Optionally, the columnar porous metal oxide in which the pores are arranged in the hexagonal shape may be dehydrated or sintered before the benzene adsorption capacity is measured, and sintering may be performed, for example, at 540° C. for 1 hour.

As an example, the columnar porous metal oxide in which the pores are arranged in the hexagonal shape may be manufactured by crystallizing a reactant including alumina ($Al_2O_3$) and silica ($SiO_2$) in a weight ratio of 0:1 to 0.5:1, specifically 0.00:1 to 0.5:1, at a temperature of 25° C. to 175° C., specifically 50° C. to 150° C. At this time, pH is preferably maintained between 9 to 14.

A silicon supply source may be used instead of silica, and organic silicate, such as quaternary ammonium silicate, may be used as the silicon supply source. Specifically, tetramethylammonium silicate or tetraethyl orthosilicate may be used.

The reactant used to manufacture the columnar porous metal oxide in which the pores are arranged in the hexagonal shape may further include alkali metal, alkaline earth metal (M), or an organic inducement additive (R) in addition to alumina and silica, and the reactant may be dissolved in a solvent, such as $C_1$-$C_6$ alcohol, $C_1$-$C_6$ diol, and/or water.

As an example, the alkali metal or the alkaline earth metal (M) may be sodium, potassium, magnesium, or calcium. The organic inducement additive (R) assists formation of a crystalline structure, and functions as a mold of the reactant during nucleus formation and growth processes. Nonrestrictive examples of the organic inducement additive capable of performing the above function may be cetyltrimethylammonium, cetyltrimethylphosphonium, octadecyltrimethylphosphonium, benzyltrimethylammonium, cetylpyridinium, myristyltrimethylammonium, decyltrimethylammonium, dodecyltrimethylammonium, and dimethyldidodecylammonium.

The alkali metal or the alkaline earth metal (M) may have a molar ratio of oxides, $M_{2/e}O/(SiO_2+Al_2O_3)$, of 0 to 5, specifically 0 to 3. Here, e is weighted average valence of M. In addition, the organic inducement additive (R) may have a molar ratio of oxides, $R_{2/f}O/(SiO_2+Al_2O_3)$, of 0.01 to 2, specifically 0.03 to 1. Here, f is weighted average valence of R.

As a concrete example of a method of manufacturing the columnar porous metal oxide in which the pores are arranged in the hexagonal shape, the organic inducement additive (R) is mixed such that a molar ratio of a solvent/$R_{2/f}O$ is 50 to 800, specifically 50 to 500, to manufacture a primary mold mixture. An oxide supply source, such as silica and/or alumina, is added to the primary mold mixture such that a molar ratio of $R_{2/f}O/(SiO_2+Al_2O_3)$ is 0.01 to 2.0 to manufacture a mixture. The manufactured mixture is stirred at 20° C. to 40° C. for 5 minutes to 3 hours, and is then stirred or left without stirring at 20° C. to 100° C. for 10 minutes to 24 hours. The stirred mixture is crystallized at a temperature of 50° C. to 175° C. for 1 hour to 72 hours to manufacture the columnar porous metal oxide in which the pores are arranged in the hexagonal shape. Optionally, the manufactured columnar porous metal oxide in which the pores are arranged in the hexagonal shape may be dehydrated or sintered, and sintering may be performed, for example, at 540° C. for 1 hour.

Meanwhile, the ion exchange membrane may include the columnar porous metal oxide in an amount of 0.01 parts by weight to 0.50 parts by weight, specifically 0.05 parts by weight to 0.25 parts by weight, based on 1 part by weight of the ion conductor. In the case in which the content of the columnar porous metal oxide is less than 0.01 parts by weight based on 1 part by weight of the ion conductor, it may be difficult to effectively prevent permeation of ions. In the case in which the content of the columnar porous metal oxide is greater than 0.50 parts by weight based on 1 part by weight of the ion conductor, the columnar porous metal oxide may cohere in the ion exchange membrane, or the physical properties of the ion exchange membrane may be deteriorated.

As another example, in the present disclosure, an ion-capturing additive capable of capturing the ions may be introduced into the path through which the ions move in order to prevent permeation of the ions, whereby it is possible to improve voltage efficiency of the ion exchange membrane and to prevent degradation of the ion exchange membrane. Also, in the case in which the captured ion is a pentavalent vanadium ion, the capacity of the ion exchange membrane may be preserved by means of a recovery system where the pentavalent vanadium ion is separated from the ion-capturing additive and moves back to the original active material region due to formation of an acid atmosphere and conveyance of a material by protons that move from a negative electrode to a positive electrode at the time of discharging.

Specifically, any ion-capturing additive may be used as long as the ion-capturing additive is organic matter capable of forming an organic-inorganic complex with the ions. Since the ion-capturing additive forms an organic-inorganic complex with the ions, the ions may move in the form of the organic-inorganic complex. In this case, the size of the ions may be increased, whereby permeation of the ions may be inhibited.

The organic matter capable of forming an organic-inorganic complex with the ions may be one selected from the group consisting of a crown ether, a nitrogen-containing cyclic compound, and a mixture thereof.

The crown ether is a compound in which an oxyethylene group is connected in the form of —$(OCH_2CH_2)_n$— to have a large cyclic polyethylene ether framework. The crown ether may be one selected from the group consisting of 12-crown-4, 15-crown-5, 18-crown-6, dibenzo-18-crown-6, diaza-18-crown-6, and a mixture thereof.

The nitrogen-containing cyclic compound is a cyclic compound having a ring atom number of 4 to 20 in which one or more (e.g. one, two, three, or four) carbon atoms are substituted by nitrogen atoms. The nitrogen-containing cyclic compound includes a saturated ring, a partially unsaturated ring, and an aromatic ring (i.e. a hetero aromatic ring, and also includes a cyclic aromatic compound in which a nitrogen atom in a ring is oxidized or quaternized to form, for example, N-oxide or quaternary salt. Specifically, the nitrogen-containing cyclic compound may be one selected from the group consisting of pyrrole, thiazole, isothiazole, oxazole, isoxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine, indoline, and a mixture thereof.

The ion exchange membrane may include the ion-capturing additive, such as the crown ether or the nitrogen-containing cyclic compound, in an amount of 0.001 parts by weight to 0.20 parts by weight, specifically 0.01 parts by weight to 0.10 parts by weight, based on 1 part by weight of the ion conductor. In the case in which the content of the ion-capturing additive is less than 0.001 parts by weight based on 1 part by weight of the ion conductor, the effect of preventing permeation of ions may be reduced. In the case in which the content of the ion-capturing additive is greater than 0.20 parts by weight based on 1 part by weight of the ion conductor, resistance of the ion exchange membrane may be increased due to excessive content of the ion-capturing additive in the ion exchange membrane.

Meanwhile, the ion-permeation preventing additive may be included in the ion exchange membrane in various forms. As an example, the ion-permeation preventing additive may be dispersed in the polymer membrane in the state of being mixed with the ion conductor.

The polymer membrane in which the ion-permeation preventing additive is dispersed may be manufactured by physically mixing the ion-permeation preventing additive with an ion conductor solution and forming a membrane using the ion conductor solution.

The ion conductor solution may be a dispersion solution. A commercially available ion conductor solution or dispersion solution may be used as the ion conductor solution or the dispersion solution or the ion conductor may be dispersed in a solvent in order to manufacture the ion conductor solution or the dispersion solution.

A solvent selected from the group consisting of water, a hydrophilic solvent, an organic solvent, and a mixture thereof may be used as a solvent for manufacture of the ion conductor solution or the dispersion solution. The hydrophilic solvent may have at least one functional group selected from the group consisting of alcohol, isopropyl alcohol, ketone, aldehyde, carbonate, carboxylate, carboxylic acid, ether, and amide, each of which includes straight-chain or branched-chain saturated or unsaturated hydrocarbon having a carbon number ranging from 1 to 12 as the main chain thereof. Each thereof may include an alicyclic or aromatic cyclic compound as at least a portion of the main chain thereof. The organic solvent may be selected from among N-methylpyrrolidone, dimethyl sulfoxide, tetrahydrofuran, and a mixture thereof.

In a method of forming the polymer membrane using the ion conductor solution, the ion conductor solution may be coated on a substrate, and then the substrate may be dried. Any one selected from the group consisting of bar coating, comma coating, slot-die coating, screen printing, spray coating, doctor blade coating, lamination, and a combination thereof may be used as the coating. The drying may be performed at 60° C. to 150° C. for 0.5 hours to 12 hours.

As another example, the ion-permeation preventing additive may be formed on one surface or opposite surfaces of the polymer membrane in the form of a coating layer. That is, the ion exchange membrane may include a polymer membrane including the ion conductor and a coating layer located on one surface or opposite surfaces of the polymer membrane, the coating layer including the ion-permeation preventing additive. In this case, the coating layer including the ion-permeation preventing additive may be included in an amount of 0.05 parts by volume to 1.0 part by volume, specifically 0.05 parts by volume to 0.2 parts by volume, based on 1 part by volume of the polymer membrane. In the case in which the content of the coating layer is less than 0.05 parts by volume based on 1 part by volume of the polymer membrane, the effect of preventing permeation of vanadium ions may be reduced.

The ion exchange membrane may be manufactured by forming the polymer membrane and coating a coating layer thereon using a solution including the ion-permeation preventing additive. The solution including the ion-permeation preventing additive may be manufactured by adding the ion-permeation preventing additive to a solvent, and a solvent selected from the group consisting of water, a hydrophilic solvent, an organic solvent, and a mixture thereof, which is used to manufacture the ion conductor solution, may be used as the solvent. Also, in a method of forming the coating layer, a solution including the ion-permeation preventing additive may be coated on the polymer membrane, and then the polymer membrane may be dried. Any one selected from the group consisting of bar coating, comma coating, slot-die coating, screen printing, spray coating, doctor blade coating, lamination, and a combination thereof may be used as the method of coating the solution including the ion-permeation preventing additive on the polymer membrane. The drying may be performed at 60° C. to 150° C. for 0.5 hours to 12 hours.

As a further example, the ion exchange membrane may be configured in a form in which a first polymer membrane, in which the ion-permeation preventing additive is not dispersed, and a second polymer membrane, in which the ion-permeation preventing additive is dispersed, are stacked. That is, in the ion exchange membrane, a first polymer membrane including the ion conductor and a second polymer membrane including the ion conductor and the ion-permeation preventing additive dispersed in the state of being mixed with the ion conductor may be stacked. A plurality of first polymer membranes and a plurality of second polymer membranes may be alternately stacked. In this case, the second polymer membrane may be included in an amount of 0.05 parts by volume to 1.0 part by volume, specifically 0.05 parts by volume to 0.2 parts by volume, based on 1 part by volume of the first polymer membrane. In the case in which the content of the second polymer membrane is less than 0.05 parts by volume based on 1 part by volume of the first polymer membrane, the effect of preventing permeation of vanadium ions may be reduced.

The ion exchange membrane may be manufactured by individually forming the first polymer membrane and the second polymer membrane and then pressing the two polymer membranes, and the plurality of polymer membranes may be stacked using a lamination method.

FIG. 1 is a view schematically showing an example of selective ion permeation in an ion exchange membrane having a form in which a first polymer membrane and a second polymer membrane are stacked.

Referring to FIG. 1, an ion exchange membrane 104 has a form in which a first polymer membrane 10 including a first ion conductor 11 and a second polymer membrane 20 including a second ion conductor 21 and a columnar porous metal oxide 22 dispersed in the state of being mixed with the second ion conductor 21 are stacked. FIG. 1 shows the case in which the columnar porous metal oxide 22 is formed in a hexagonal prismatic shape in which pores in the columnar porous metal oxide are arranged in a hexagonal shape. The columnar porous metal oxide 22 has micropores, the size of which is similar to the size (1.15 nm) of a pentavalent vanadium ion ($VO_2^+$), whereby it is possible to prevent permeation of the vanadium ion. Meanwhile, the size of the pores in the columnar porous metal oxide is greater than the size (<0.32 nm) of a proton ($H^+$) or a hydronium ion supposed to be transmitted, whereby allowing the selective permeation of the ion.

Figure 2:
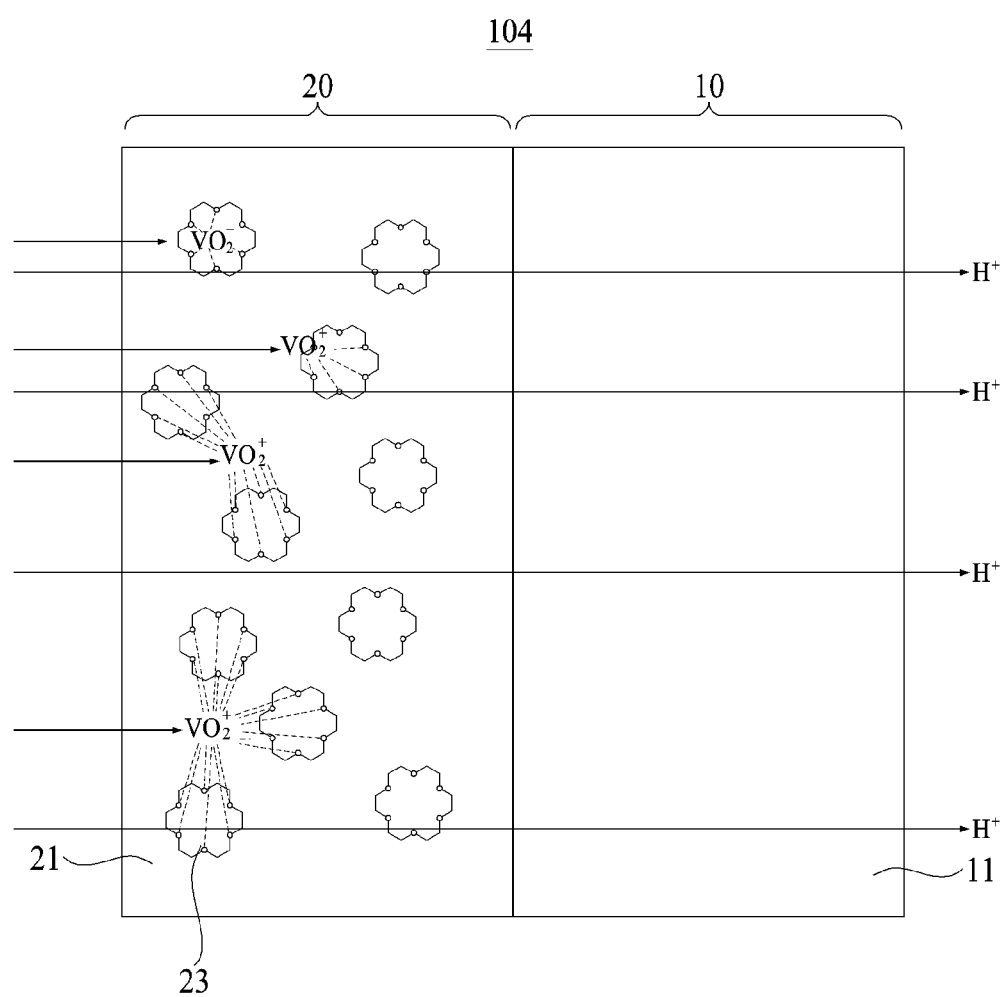
FIG. 2 is a view schematically showing another example of selective ion permeation in an ion exchange membrane having a form in which a first polymer membrane and a second polymer membrane are stacked.

FIG. 2 is a view schematically showing another example of selective ion permeation in an ion exchange membrane having a form in which a first polymer membrane and a second polymer membrane are stacked.

FIG. 2 shows the case in which an ion-capturing additive 23 is a crown ether. Since the ion-capturing additive 23 forms an organic-inorganic complex with a vanadium ion, the vanadium ion may move in the form of the organic-inorganic complex. In this case, the size of the vanadium ion may be increased, whereby permeation of the vanadium ion may be inhibited. Meanwhile, a proton ($H^+$) or a hydronium ion supposed to be transmitted does not react with the ion-capturing additive 23, whereby allowing the selective permeation of the ion.

An energy storage device according to another embodiment of the present disclosure includes the ion exchange membrane. Hereinafter, the case in which the energy storage device is a redox flow battery will be described in detail. However, the present disclosure is not limited thereto, and the ion exchange membrane may also be applied to an energy storage device in the form of a fuel cell or a secondary battery.

In an illustration of the energy storage device, the ion exchange membrane blocks ions due to a small ion channel, whereby the ion exchange membrane exhibits low ion permeability. In the case in which the ion exchange membrane is applied to a vanadium redox flow battery, therefore, a problem in that energy efficiency is reduced due to crossover of a vanadium active material is solved, whereby it is possible to achieve high energy efficiency. Preferably, the energy storage device is a redox flow battery.

In the redox flow battery, a positive electrode electrolyte and a negative electrode electrolyte are supplied to a battery cell including a positive electrode and a negative electrode disposed so as to face each other and an ion exchange membrane interposed between the positive electrode and the negative electrode in order to charge and discharge the battery cell.

The redox flow battery may be an all-vanadium redox battery, which uses a V(IV)/V(V) redox couple as a positive electrode electrolyte and a V(II)/V(III) redox couple as a negative electrode electrolyte, a vanadium-based redox battery, which uses a halogen redox couple as a positive electrode electrolyte and a V(II)/V(III) redox couple as a negative electrode electrolyte, a polysulfide bromine redox battery, which uses a halogen redox couple as a positive electrode electrolyte and a sulfide redox couple as a negative electrode electrolyte, or a zinc-bromine (Zn—Br) redox battery, which uses a halogen redox couple as a positive electrode electrolyte and a zinc (Zn) redox couple as a negative electrode electrolyte. However, the present disclosure is not limited as to the kind of the redox flow battery.

Hereinafter, the case in which the redox flow battery is an all-vanadium redox battery will be described by way of example. However, the redox flow battery according to the present disclosure is not limited to the all-vanadium redox battery.

Figure 3:
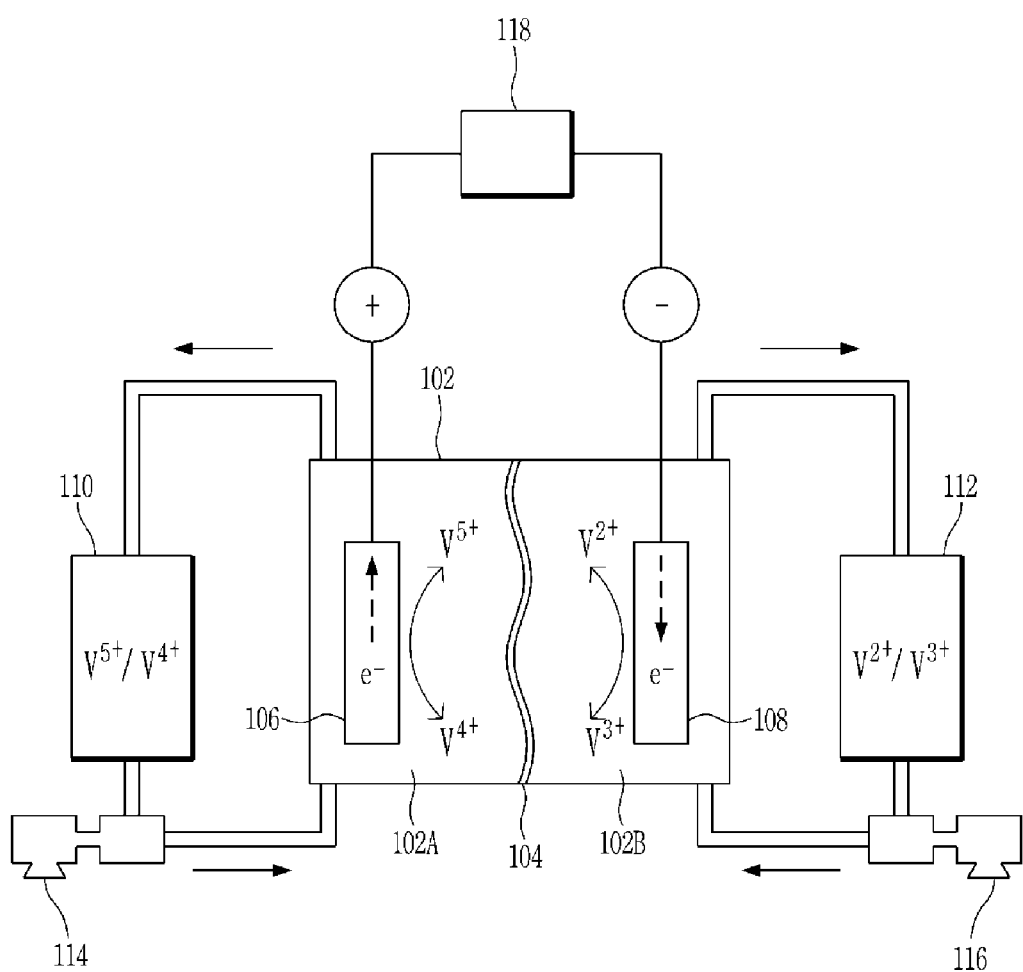
FIG. 3 is a view schematically showing an all-vanadium redox battery according to another embodiment of the present disclosure.

FIG. 3 is a view schematically showing the all-vanadium redox flow battery.

Referring to FIG. 3, the redox flow battery includes a cell housing 102, an ion exchange membrane 104 installed to divide the cell housing 102 into a positive electrode cell 102A and a negative electrode cell 102B, and a positive electrode 106 and a negative electrode 108 located respectively in the positive electrode cell 102A and the negative electrode cell 102B.

In addition, the redox flow battery may further include a positive electrode electrolyte storage tank 110, in which a positive electrode electrolyte is stored, and a negative electrode electrolyte storage tank 112, in which a negative electrode electrolyte is stored.

In addition, the redox flow battery may further include a positive electrode electrolyte inlet and a positive electrode electrolyte outlet formed respectively in the upper end and the lower end of the positive electrode cell 102A and a negative electrode electrolyte inlet and a negative electrode electrolyte outlet formed respectively in the upper end and the lower end of the negative electrode cell 102B.

The positive electrode electrolyte stored in the positive electrode electrolyte storage tank 110 is introduced into the positive electrode cell 102A through the positive electrode electrolyte inlet by a pump 114, and is then discharged from the positive electrode cell 102A through the positive electrode electrolyte outlet.

In the same manner, the negative electrode electrolyte stored in the negative electrode electrolyte storage tank 112 is introduced into the negative electrode cell 102B through the negative electrode electrolyte inlet by a pump 116, and is then discharged from the negative electrode cell 102B through the negative electrode electrolyte outlet.

In the positive electrode cell 102A, electrons move through the positive electrode 106 depending on operation of a power supply/load 118, whereby a reduction-oxidation reaction of $V^{5+} \leftrightarrow V^{4+}$ occurs. In the same manner, in the negative electrode cell 102B, electrons move through the negative electrode 108 depending on operation of the power supply/load 118, whereby a reduction-oxidation reaction of $V^{2+} \leftrightarrow V^{3+}$ occurs. After the reduction-oxidation reaction, the positive electrode electrolyte and the negative electrode electrolyte move to the positive electrode electrolyte storage tank 110 and the negative electrode electrolyte storage tank 112, respectively.

Each of the positive electrode 106 and the negative electrode 108 is made of one selected from the group consisting of at least one metal selected from among Ru, Ti, Ir, Mn, Pd, Au, and Pt, a composite including an oxide of at least one metal selected from among Ru, Ti, Ir, Mn, Pd, Au, and Pt (e.g. a composite at which an Ir oxide or an Ru oxide is coated on a Ti substrate), a carbon complex including the composite, a dimensionally stable electrode (DSE) including the composite, a conductive polymer (e.g. an electrically conductive polymer material, such as polyacetylene or polythiophene), graphite, glassy carbon, conductive diamond, conductive diamond-like carbon (DLC), non-woven fabric made of carbon fiber, and woven fabric made of carbon fiber.

Each of the positive electrode electrolyte and the negative electrode electrolyte may include one selected from the group consisting of a titanium ion, a vanadium ion, a chromium ion, a zinc ion, a tin ion, and a mixture thereof.

For example, the negative electrode electrolyte may include a bivalent vanadium ion ($V^{2+}$) or a trivalent vanadium ion ($V^{3+}$) as a negative electrode electrolyte ion, and the positive electrode electrolyte may include a tetravalent vanadium ion ($V^{4+}$) or a pentavalent vanadium ion ($V^{5+}$) as a positive electrode electrolyte ion.

The concentration of the metal ion included in each of the positive electrode electrolyte and the negative electrode electrolyte is preferably 0.3 M to 5 M.

Any one selected from the group consisting of $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$, and $NaNO_3$ may be used as a solvent of each of the positive electrode electrolyte and the negative electrode electrolyte. Since the metal ions, which constitute positive electrode and negative electrode active materials, are all water-soluble, an aqueous solution may be appropriately used as the solvent of each of the positive electrode electrolyte and the negative electrode electrolyte. Particularly, in the case in which any one selected from the group consisting of sulfuric acid, phosphoric acid, nitric acid, sulfate, phosphate, and nitrate is used as the aqueous solution, it is possible to improve stability, reactivity, and solubility of the metal ion.

Meanwhile, the ion exchange membrane may also be applied to a membrane-electrode assembly for fuel cells. Specifically, the membrane-electrode assembly may include an anode and a cathode located so as to be opposite each other and an ion exchange membrane located between the anode and the cathode.

MODE FOR INVENTION

Hereinafter, examples of the present disclosure will be described in detail with reference to the accompanying drawings such that the examples of the present disclosure can be easily implemented by a person having ordinary skill in the art to which the present disclosure pertains. However, the present disclosure may be realized in various different forms, and is not limited to the examples described herein.

Manufacturing Example 1: Manufacture of Ion Conductor

Manufacturing Example 1-1

1) Manufacture of Hydrophobic Repeating Unit

As expressed by Reaction Formula 3 below, bisphenol A and 1,3-bis(4-fluorobenzoyol)benzene were reacted using a co-solvent of DMAc/toluene in the presence of potassium carbonate at 160° C. to 180° C. for 30 hours, discharged into purified water so as to be washed, and dried using hot air. At this time, Carothers equation was used in order to adjust the degree of polymerization of an oligomer.

1.

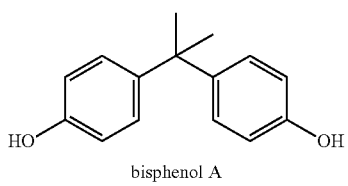

bisphenol A

2.

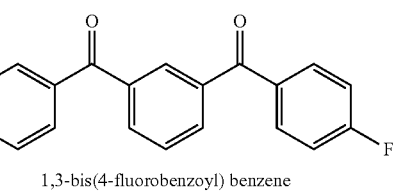

1,3-bis(4-fluorobenzoyl) benzene

3.

$K_2CO_3$
Molecular Weight: 138.21
Potassium carbonate

DMAc
(20% solution concentration)
Toluene

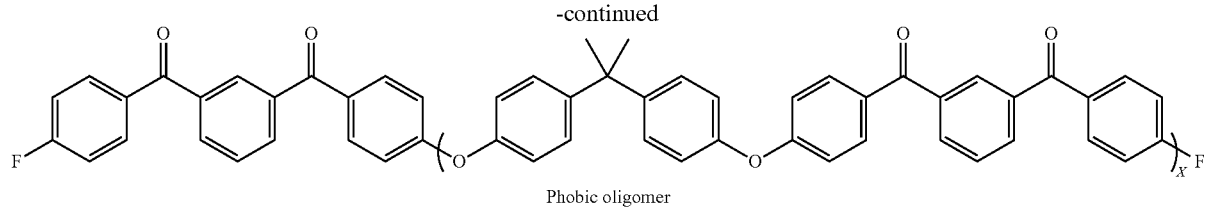

Phobic oligomer

2) Manufacture of Hydrophilic Repeating Unit

As expressed by Reaction Formula 4 below, 4,4'-(9-fluorenyliene)diphenol and bis(4-fluorophenyl)sulfone were reacted using a co-solvent of DMAc/toluene in the presence of potassium carbonate at 160° C. to 180° C. for 30 hours, discharged into purified water so as to be washed, and dried using hot air. At this time, Carothers equation was used in order to adjust the degree of polymerization of an oligomer.

3) Manufacture of Polymer

The manufactured hydrophobic repeating unit and hydrophilic repeating unit were reacted using a co-solvent of DMAc/toluene in the presence of potassium carbonate at 160° C. to 180° C. for 30 hours, discharged into purified water so as to be washed, and dried using hot air. The molar ratio of the hydrophilic repeating unit to the hydrophobic repeating unit of the manufactured polymer was 1:3.5.

[Reaction Formula 4]

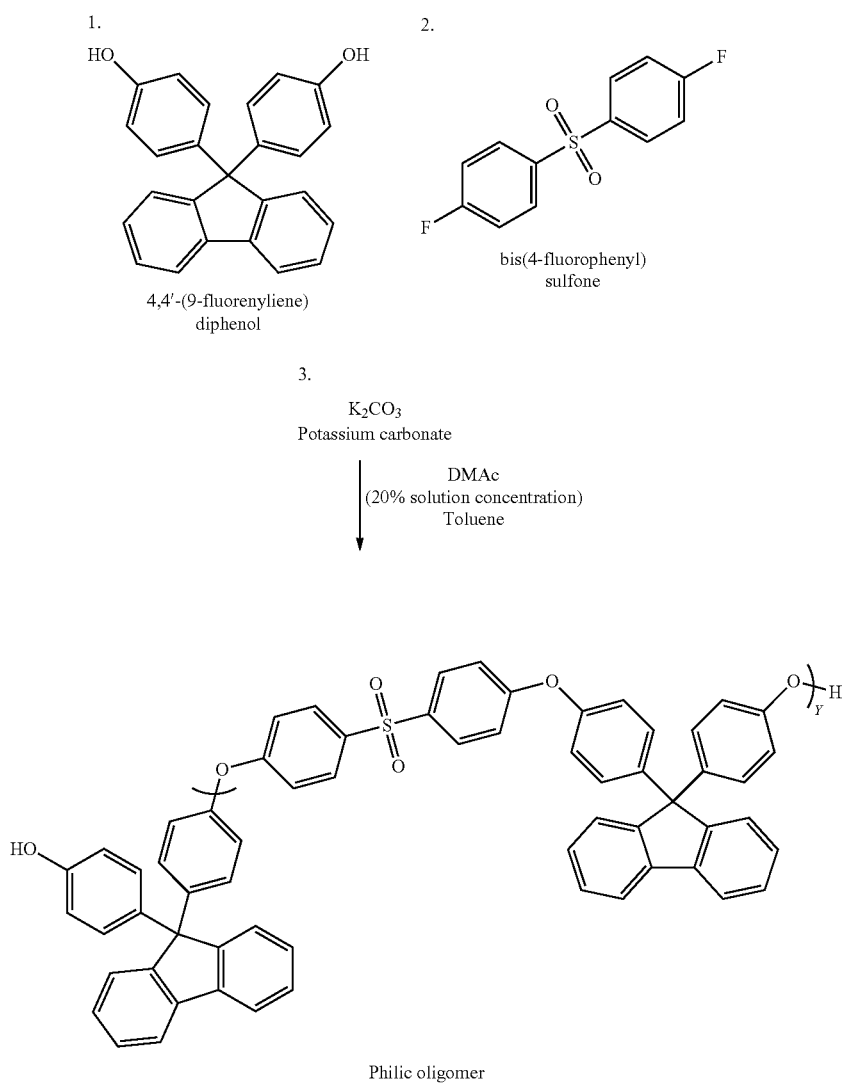

Philic oligomer

4) Manufacture of Ion Conductor

The manufactured polymer was dissolved in dichloromethane, slowly introduced into a chlorosulfonic acid/DCM solution, the amount of which was five times as large as the amount of the dichloromethane having the polymer dissolved therein, and stirred for 24 hours. The solution was removed, and the separated solid body was washed using purified water and then dried using hot air.

Manufacturing Example 1-2

An ion conductor was manufactured in the same manner as in Manufacturing Example 1-1, except that the polymer was manufactured such that the molar ratio of the hydrophilic repeating unit to the hydrophobic repeating unit was 1:2.5, unlike Manufacturing Example 1-1.

Manufacturing Example 1-3

1) Manufacture of Hydrophobic Repeating Unit

As expressed by Reaction Formula 5 below, 4,4'-dihydroxybenzophenone and 2,6-difluorobenzonitrile were reacted using a co-solvent of DMAc/toluene in the presence of potassium carbonate at 160° C. to 180° C. for 30 hours, discharged into purified water so as to be washed, and dried using hot air. At this time, Carothers equation was used in order to adjust the degree of polymerization of an oligomer.

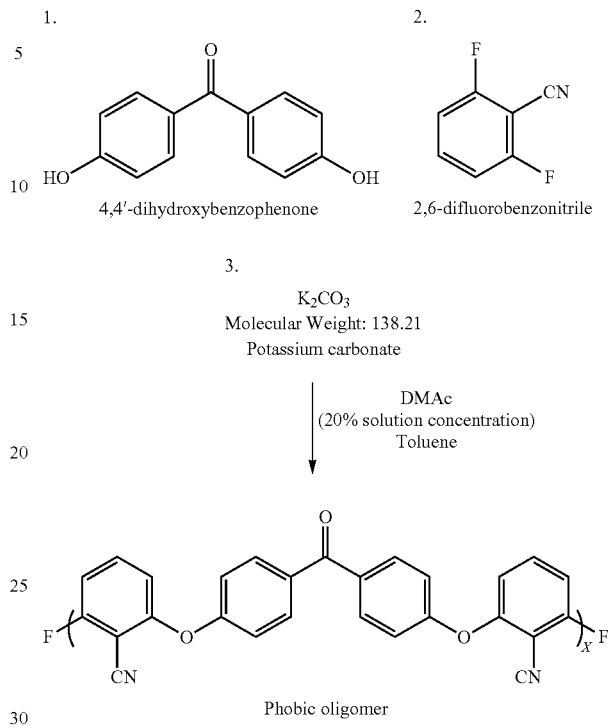

[Reaction Formula 5]

2) Manufacture of Hydrophilic Repeating Unit

As expressed by Reaction Formula 6 below, 4,4'-(9-fluorenyliene)diphenol and bis(4-fluorophenyl)sulfone were reacted using a co-solvent of DMAc/toluene in the presence of potassium carbonate at 160° C. to 180° C. for 30 hours, discharged into purified water so as to be washed, and dried using hot air. At this time, Carothers equation was used in order to adjust the degree of polymerization of an oligomer.

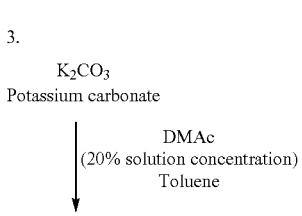

[Reaction Formula 6]

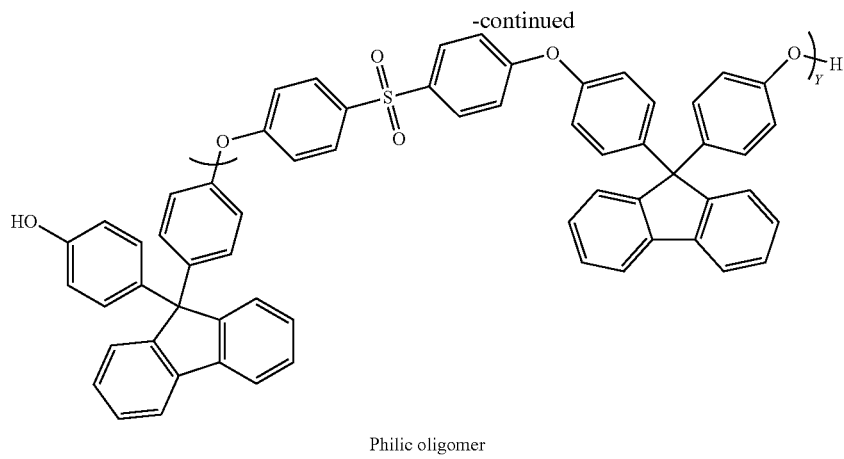

Philic oligomer

3) Manufacture of Polymer

The manufactured hydrophobic repeating unit and hydrophilic repeating unit were reacted using a co-solvent of DMAc/toluene in the presence of potassium carbonate at 160° C. to 180° C. for 30 hours, discharged into purified water so as to be washed, and dried using hot air. The molar ratio of the hydrophilic repeating unit (Y) to the hydrophobic repeating unit (X) of the manufactured polymer was 1:3.5.

4) Manufacture of Ion Conductor

The manufactured polymer was dissolved in dichloromethane, slowly introduced into a chlorosulfonic acid/DCM solution, the amount of which was five times as large as the amount of the dichloromethane having the polymer dissolved therein, and stirred for 24 hours. The solution was removed, and the separated solid body was washed using purified water and then dried using hot air.

Manufacturing Example 1-4

An ion conductor was manufactured in the same manner as in Manufacturing Example 1-3, except that the polymer was manufactured such that the molar ratio of the hydrophilic repeating unit to the hydrophobic repeating unit was 1:2.5, unlike Manufacturing Example 1-3.

Manufacturing Example 1-5

1) Manufacture of Hydrophobic Repeating Unit 4,4'-dihydroxybenzophenone and bis(4-fluorophenyl)sulfone were reacted using a co-solvent of DMAc/toluene in the presence of potassium carbonate at 160° C. to 180° C. for 30 hours, discharged into purified water so as to be washed, and dried using hot air. At this time, Carothers equation was used in order to adjust the degree of polymerization of an oligomer.

2) Manufacture of Hydrophilic Repeating Unit 4,4'-(9-fluorenyliene)diphenol and 1,3-bis(4-fluorobenzoyol)benzene were reacted using a co-solvent of DMAc/toluene in the presence of potassium carbonate at 160° C. to 180° C. for 30 hours, discharged into purified water so as to be washed, and dried using hot air. At this time, Carothers equation was used in order to adjust the degree of polymerization of an oligomer.

3) Manufacture of Polymer

The manufactured hydrophobic repeating unit and hydrophilic repeating unit were reacted using a co-solvent of DMAc/toluene in the presence of potassium carbonate at 160° C. to 180° C. for 30 hours, discharged into purified water so as to be washed, and dried using hot air to manufacture a polymer expressed by Chemical Formula 8 below. The molar ratio of the hydrophilic repeating unit (X) to the hydrophobic repeating unit (Y) of the manufactured polymer was 1:3.5.

[Chemical Formula 8]

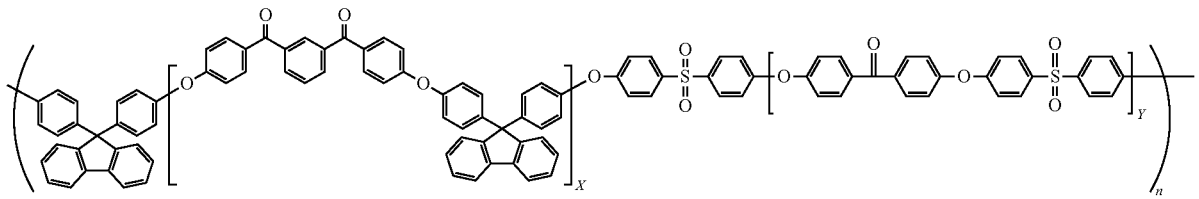

4) Manufacture of Ion Conductor

The manufactured polymer was dissolved in dichloromethane, slowly introduced into a chlorosulfonic acid/DCM solution, the amount of which was five times as large as the amount of the dichloromethane having the polymer dissolved therein, and stirred for 24 hours. The solution was removed, and the separated solid body was washed using purified water and then dried using hot air.

Manufacturing Example 1-6

An ion conductor was manufactured in the same manner as in Manufacturing Example 1-5, except that the polymer was manufactured such that the molar ratio of the hydrophilic repeating unit to the hydrophobic repeating unit was 1:2.5, unlike Manufacturing Example 1-5.

Manufacturing Example 2: Manufacture of Porous Support

Manufacturing Example 2-1

Polyamic acid was dissolved in dimethylformamide to manufacture 5 L of a spinning solution having viscosity of 480 poise. The manufactured spinning solution was fed to a solution tank and was then supplied to a spinning chamber, which included 20 nozzles and to which a high voltage of 3 kV was applied, through a quantitative gear pump, and spinning was carried out to manufacture a nanofiber precursor web. At this time, the amount of the solution that was supplied was 1.5 ml/min. The manufactured nanofiber precursor web was thermally treated at 350° C. to manufacture a porous support (porosity: 40 volume %).

The weight per unit area of polyimide nanofiber in the porous support was 6.8 gsm.

Manufacturing Example 3: Manufacture of Porous Metal Oxide

Manufacturing Example 3-1

100 g of cetyltrimethylammonium (CTMA) hydroxide solution and 100 g of tetramethylammonium (TMA) silicate solution (10 weight % of silica) were mixed with each other while being stirred. 25 g of HiSil, which is precipitated hydrated silica having a particle size of 0.02 μm, was added to the mixture. The mixture having the silica added thereto was put in a polypropylene bottle, and was crystallized in a steam box at 95° C. during the night.

A generated solid product was filtered, collected, and dried in air at ambient temperature. Subsequently, the product was calcined in nitrogen at 540° C. for 1 hour, and was then calcined in air for 6 hours.

The surface area of the calcined product was 475 m²/g, and the benzene adsorption capacity of the calcined product was 21.5 g/100 g (@ 50 torr, 25° C.)

In addition, the X-ray diffraction pattern of the product was measured. As a result, 10 Å unit d-spacing was 8.842 degrees 2-theta (Cu K-alpha radiation), and 18 Å unit d-spacing was 4.909 degrees 2-theta (Cu K-alpha radiation). The product exhibited a very strong peak at 37.8±2.0 Å d-spacing, and had a weak peak at 21.6±1.0 and 19.2±1.0 Å d-spacing.

Also, in a transmission electron micrograph (TEM) of the product, uniform pores were arranged in a hexagonal shape, and an image of a hexagonal electron diffraction pattern having a $d_{100}$ value of about 39 Å was generated.

The manufactured porous metal oxide has a pore size of 1 nm, a height of 20 nm, and an aspect ratio of 1:1.

Example 1: Manufacture of Single-Membrane Type Ion Exchange Membrane

Examples 1-1 to 1-6

0.2 parts by weight of the ion conductor manufactured according to each of Manufacturing Examples 1-1 to 1-6 and 0.04 parts by weight of the porous metal oxide manufactured according to Manufacturing Example 3-1 were dissolved in 1 part by weight of DMAc and were then formed as a membrane to manufacture a single-membrane type ion exchange membrane.

The manufactured ion exchange membrane included the porous metal oxide in an amount of 0.2 parts by weight based on 1 part by weight of the ion conductor.

Comparative Examples 1-1 to 1-6

0.2 parts by weight of the ion conductor manufactured according to each of Manufacturing Examples 1-1 to 1-6 was dissolved in 1 part by weight of DMAc and was then formed as a membrane to manufacture a single-membrane type ion exchange membrane.

Example 2: Manufacture of Coating-Layer Type Ion Exchange Membrane

Examples 2-1 to 2-6

0.2 parts by weight of the ion conductor manufactured according to each of Manufacturing Examples 1-1 to 1-6 was dissolved in 1 part by weight of DMAc and was then formed as a membrane to manufacture a single-membrane type polymer membrane.

0.2 parts by weight of the porous metal oxide manufactured according to Manufacturing Example 3-1 was dissolved in 1 part by weight of DMAc to manufacture a solution including the porous metal oxide. The solution including the porous metal oxide was primarily coated on one surface of the polymer membrane, was primarily dried at 90° C. for 1 hour, was secondarily coated on the primarily dried polymer membrane, and was secondarily dried at 90° C. for 1 hour to form a coating layer.

The manufactured ion exchange membrane included the porous metal oxide in an amount of 0.04 parts by weight based on 1 part by weight of the ion conductor, and the coating layer including the porous metal oxide was included in an amount of 0.2 parts by volume based on 1 part by volume of the polymer membrane.

Example 2-7

0.2 parts by weight of the ion conductor manufactured according to Manufacturing Example 1-1 was dissolved in 1 part by weight of DMAc and was then formed as a membrane to manufacture a single-membrane type polymer membrane.

0.04 parts by weight of the porous metal oxide manufactured so as to have a pore size of 2 nm using the same method as in Manufacturing Example 3-1 was dissolved in 1 part by weight of DMAc to manufacture a solution including the porous metal oxide. The solution including the porous metal oxide was primarily coated on one surface of the polymer membrane, was primarily dried at 90° C. for 1 hour, was secondarily coated on the primarily dried polymer membrane, and was secondarily dried at 90° C. for 1 hour to form a coating layer.

The manufactured ion exchange membrane included the porous metal oxide in an amount of 0.04 parts by weight based on 1 part by weight of the ion conductor, and the coating layer including the porous metal oxide was included in an amount of 0.2 parts by volume based on 1 part by volume of the polymer membrane.

Comparative Examples 2-1 to 2-6

0.2 parts by weight of the ion conductor manufactured according to each of Manufacturing Examples 1-1 to 1-6 was dissolved in 1 part by weight of DMAc and was then formed as a membrane to manufacture a single-membrane type polymer membrane.

0.04 parts by weight of silica having a 3D cubic shape and a pore size of 1 nm (Manufacturing Company: ACS Materials, Product Name: MCM-48) was dissolved in 1 part by weight of DMAc to manufacture a solution including a porous metal oxide. The solution including the porous metal oxide was primarily coated on one surface of the polymer membrane, was primarily dried at 90° C. for 1 hour, was secondarily coated on the primarily dried polymer membrane, and was secondarily dried at 90° C. for 1 hour to form a coating layer.

The manufactured ion exchange membrane included the silica in an amount of 0.04 parts by weight based on 1 part by weight of the ion conductor, and the coating layer including the porous metal oxide was included in an amount of 0.2 parts by volume based on 1 part by volume of the polymer membrane.

Example 3: Manufacture of Stacked-Membrane Type Ion Exchange Membrane

Examples 3-1 to 3-6

0.2 parts by weight of the ion conductor manufactured according to each of Manufacturing Examples 1-1 to 1-6 was dissolved in 1 part by weight of DMAc and was then formed as a membrane to manufacture a first polymer membrane having a thickness of 40 μm.

0.2 parts by weight of the ion conductor manufactured according to each of Manufacturing Examples 1-1 to 1-6 and 0.04 parts by weight of the porous metal oxide manufactured according to Manufacturing Example 3-1 were dissolved in 1 part by weight of DMAc and were then formed as a membrane to manufacture a second polymer membrane having a thickness of 10 μm.

The first polymer membrane and the second polymer membrane were stacked and thermally pressed at 150° C. and 1500 MPa to manufacture an ion exchange membrane.

The manufactured ion exchange membrane included the porous metal oxide in an amount of 0.04 parts by weight based on 1 part by weight of the ion conductor, and the second polymer membrane was included in an amount of 0.2 parts by volume based on 1 part by volume of the first polymer membrane.

Example 4: Manufacture of Reinforced-Membrane Type Ion Exchange Membrane

Examples 4-1 to 4-6

0.2 parts by weight of the ion conductor manufactured according to each of Manufacturing Examples 1-1 to 1-6 and 0.04 parts by weight of the porous metal oxide manufactured according to Manufacturing Example 3-1 were dissolved in 1 part by weight of DMAc to manufacture an ion conductor solution.

Subsequently, the porous support manufactured according to Manufacturing Example 2-1 was impregnated with the ion conductor solution twice for 30 minutes, was subjected to decompression for 1 hour, and was dried in a vacuum at 80° C. for 10 hours to manufacture an ion exchange membrane.

The manufactured ion exchange membrane included the porous metal oxide in an amount of 0.2 parts by weight based on 1 part by weight of the ion conductor.

Comparative Examples 4-1 to 4-6

0.2 parts by weight of the ion conductor manufactured according to each of Manufacturing Examples 1-1 to 1-6 was dissolved in 1 part by weight of DMAc to manufacture an ion conductor solution.

Subsequently, the porous support manufactured according to Manufacturing Example 2-1 was impregnated with the ion conductor solution twice for 30 minutes, was subjected to decompression for 1 hour, and was dried in a vacuum at 80° C. for 10 hours to manufacture an ion exchange membrane.

Experimental Example 1: Analysis of Vanadium Permeability of Manufactured Ion Exchange Membrane Vanadium permeability of the ion exchange membrane manufactured according to each of Examples 1-1 to 4-6 and Comparative Examples 1-1 to 4-6 was measured, and the results are shown in Table 1 below.

The vanadium permeability was measured by hourly measuring the permeation amount of vanadium ions by means of a UV-vis spectroscopy in the state in which the membrane was located between a $MgSO_4$ solution and a vanadium solution.

TABLE 1

| | Vanadium permeability ($cm^2$/min) |
|---|---|
| Example 1-1 | $1.57 \times 10^{-7}$ |
| Example 2-1 | $2.26 \times 10^{-8}$ |
| Example 2-7 | $9.78 \times 10^{-8}$ |
| Example 3-1 | $2.40 \times 10^{-8}$ |
| Comparative Example 1-1 | $9.71 \times 10^{-7}$ |
| Comparative Example 2-1 | $6.32 \times 10^{-8}$ |
| Comparative Example 4-1 | $6.78 \times 10^{-9}$ |
| Comparative Example 4-1 | $1.03 \times 10^{-8}$ |
| Nafion212 Commercial membrane | $2.48 \times 10^{-6}$ |

Referring to Table 1 above, it can be seen that, since the ion exchange membranes manufactured according to Examples included the porous metal oxide, they prevented the permeation of ions better than the ion exchange membranes manufactured according to Comparative Examples.

Experimental Example 2: Analysis of Performance of Manufactured Ion Exchange Membrane Voltage efficiency, current efficiency, and energy efficiency of the ion exchange membrane manufactured according to each of Examples 1-1 to 4-6 and Comparative Examples 1-1 to 4-6 were measured, and the results are shown in Table 2 below.

The energy efficiency (EE) of the ion exchange membrane was measured by measuring electrochemical properties of the ion exchange membrane using the following apparatus.

The apparatus for measuring energy efficiency included a unit cell having an electrode area of 25 cm$^2$, two aqueous solution tanks, and a pump in order to measure electrochemical properties of a vanadium redox flow battery (VRFB). A solution including 30 mL of 1.7 M $VOSO_4$ and 2.5 M $H_2SO_4$ (a tetravalent vanadium aqueous solution) was used as a positive electrode solution, and an aqueous solution obtained as the result of electrolytic reduction of the positive electrode solution (a trivalent vanadium aqueous solution) was used as a negative electrode solution. The positive electrode solution was used in a slightly larger amount than the negative electrode solution in order to inhibit overcharging. The unit cell for measurement included a membrane to be measured, heat-treated carbon felt having a size of 25 cm$^2$ (a product from Nippon Carbon Company), and a current collector. A potentiostat/galvanostat was used in order to charge/discharge the unit cell for measurement, and charging/discharging current density was measured at 60 mA/cm$^2$. In addition, charging/discharging of the unit cell was performed using a cut-off method based on 1.6 V charging and 1.0 V discharging, and was performed five times. The current efficiency (CE), the voltage efficiency (VE), and the energy efficiency (EE) of the ion exchange membrane were calculated using Mathematical Expression 2 below.

$CE=Q_D/Q_c$ $VE=E_{AD}/E_{AC}$ $EE=CE \times VE$ [Mathematical Expression 2]

Here, $Q_c[C]$ and $Q_D[C]$ are quantities of electric charge (Coulomb) at the time of charging and discharging, respectively, and $E_{AC}[V]$ and $E_{AD}[V]$ are cell voltages at the time of charging and discharging, respectively.

TABLE 2

|  | Membrane thickness (μm) | Voltage efficiency (VE) | Current efficiency (CE) | Energy efficiency (EE) |
| --- | --- | --- | --- | --- |
| Example 1-1 | 55 | 92% | 94% | 86% |
| Example 2-1 | 55 | 91% | 94% | 86% |
| Example 2-7 | 55 | 92% | 93% | 86% |
| Example 3-1 | 55 | 92% | 94% | 86% |
| Comparative Example 1-1 | 55 | 89% | 94% | 84% |
| Comparative Example 2-1 | 55 | 90% | 94% | 85% |
| Example 4-1 | 55 | 91% | 93% | 85% |
| Comparative Example 4-1 | 55 | 89% | 94% | 84% |
| Nafion212 Commercial membrane | 25 | 87% | 94% | 82% |

Referring to Table 2 above, it can be seen that, since the ion exchange membranes manufactured according to Examples included the porous metal oxide, they prevented the permeation of ions better than the ion exchange membranes manufactured according to Comparative Examples, whereby improving the voltage efficiency and inhibiting the degradation.

Example 5: Manufacture of Single-Membrane Type Ion Exchange Membrane

Examples 5-1-1 to 5-1-6

0.2 parts by weight of the ion conductor manufactured according to each of Manufacturing Examples 1-1 to 1-6 and 0.04 parts by weight of a crown ether, such as 18-Crown-6, as an ion-permeation preventing additive, were dissolved in 1 part by weight of DMAc and were then formed as a membrane to manufacture a single-membrane type ion exchange membrane.

The manufactured ion exchange membrane included the ion-permeation preventing additive in an amount of 0.2 parts by weight based on 1 part by weight of the ion conductor.

Examples 5-2-1 to 5-2-6

0.2 parts by weight of the ion conductor manufactured according to each of Manufacturing Examples 1-1 to 1-6 and 0.04 parts by weight of a nitrogen-containing cyclic compound, such as bipyridine, as an ion-permeation preventing additive, were dissolved in 1 part by weight of DMAc and were then formed as a membrane to manufacture a single-membrane type ion exchange membrane.

The manufactured ion exchange membrane included the ion-permeation preventing additive in an amount of 0.2 parts by weight based on 1 part by weight of the ion conductor.

Comparative Examples 5-1 to 5-6

20 parts by weight of the ion conductor manufactured according to each of Manufacturing Examples 1-1 to 1-6 was dissolved in 1 part by weight of DMAc and was then formed as a membrane to manufacture a single-membrane type ion exchange membrane.

Example 6: Manufacture of Coating-Layer Type Ion Exchange Membrane

Examples 6-1-1 to 6-1-6

0.2 parts by weight of the ion conductor manufactured according to each of Manufacturing Examples 1-1 to 1-6 was dissolved in 1 part by weight of DMAc and was then formed as a membrane to manufacture a single-membrane type polymer membrane.

0.04 parts by weight of a crown ether, such as 18-Crown-6, as an ion-permeation preventing additive, was dissolved in 1 part by weight of DMAc to manufacture a solution including the ion-permeation preventing additive. The solution including the ion-permeation preventing additive was primarily coated on one surface of the polymer membrane, was primarily dried at 90° C. for 1 hour, was secondarily coated on the primarily dried polymer membrane, and was secondarily dried at 90° C. for 1 hour to form a coating layer.

The manufactured ion exchange membrane included the ion-permeation preventing additive in an amount of 0.04 parts by weight based on 1 part by weight of the ion conductor, and the coating layer including the ion-permeation preventing additive was included in an amount of 0.2 parts by volume based on 1 part by volume of the polymer membrane.

Examples 6-2-1 to 6-2-6

0.2 parts by weight of the ion conductor manufactured according to each of Manufacturing Examples 1-1 to 1-6 was dissolved in 1 part by weight of DMAc and was then formed as a membrane to manufacture a single-membrane type polymer membrane.

0.04 parts by weight of a nitrogen-containing cyclic compound, such as bipyridine, as an ion-permeation preventing additive, was dissolved in 1 part by weight of DMAc to manufacture a solution including the ion-permeation preventing additive. The solution including the ion-permeation preventing additive was primarily coated on one surface of the polymer membrane, was primarily dried at 90° C. for 1 hour, was secondarily coated on the primarily dried polymer membrane, and was secondarily dried at 90° C. for 1 hour to form a coating layer.

The manufactured ion exchange membrane included the ion-permeation preventing additive in an amount of 0.04 parts by weight based on 1 part by weight of the ion conductor, and the coating layer including the ion-permeation preventing additive was included in an amount of 0.2 parts by volume based on 1 part by volume of the polymer membrane.

Example 7: Manufacture of Stacked-Membrane Type Ion Exchange Membrane

Examples 7-1-1 to 7-1-6

0.2 parts by weight of the ion conductor manufactured according to each of Manufacturing Examples 1-1 to 1-6 was dissolved in 1 part by weight of DMAc and was then formed as a membrane to manufacture a first polymer membrane having a thickness of 40 μm.

0.2 parts by weight of the ion conductor manufactured according to each of Manufacturing Examples 1-1 to 1-6 and 0.04 parts by weight of a crown ether, such as 18-Crown-6, as an ion-permeation preventing additive, were dissolved in 1 part by weight of DMAc and were then formed as a membrane to manufacture a second polymer membrane having a thickness of 10 μm.

The first polymer membrane and the second polymer membrane were stacked and thermally pressed at 150° C. and 1500 MPa to manufacture an ion exchange membrane.

The manufactured ion exchange membrane included the ion-permeation preventing additive in an amount of 0.04 parts by weight based on 1 part by weight of the ion conductor, and the second polymer membrane was included in an amount of 0.2 parts by volume based on 1 part by volume of the first polymer membrane.

Examples 7-2-1 to 7-2-6

0.2 parts by weight of the ion conductor manufactured according to each of Manufacturing Examples 1-1 to 1-6 was dissolved in 1 part by weight of DMAc and was then formed as a membrane to manufacture a first polymer membrane having a thickness of 40 μm.

0.2 parts by weight of the ion conductor manufactured according to each of Manufacturing Examples 1-1 to 1-6 and 0.04 parts by weight of a nitrogen-containing cyclic compound, such as bipyridine, as an ion-permeation preventing additive, were dissolved in 1 part by weight of DMAc and were then formed as a membrane to manufacture a second polymer membrane having a thickness of 10 μm.

The first polymer membrane and the second polymer membrane were stacked and thermally pressed at 150° C. and 1500 MPa to manufacture an ion exchange membrane.

The manufactured ion exchange membrane included the ion-permeation preventing additive in an amount of 0.04 parts by weight based on 1 part by weight of the ion conductor, and the second polymer membrane was included in an amount of 0.2 parts by volume based on 1 part by volume of the first polymer membrane.

Example 8: Manufacture of Reinforced-Membrane Type Ion Exchange Membrane

Examples 8-1-1 to 8-1-6

0.2 parts by weight of the ion conductor manufactured according to each of Manufacturing Examples 1-1 to 1-6 and 0.04 parts by weight of a crown ether, such as 18-Crown-6, as an ion-permeation preventing additive, were dissolved in 1 part by weight of DMAc to manufacture an ion conductor solution.

Subsequently, the porous support manufactured according to Manufacturing Example 2-1 was impregnated with the ion conductor solution twice for 30 minutes, was subjected to decompression for 1 hour, and was dried in a vacuum at 80° C. for 10 hours to manufacture an ion exchange membrane.

The manufactured ion exchange membrane included the ion-permeation preventing additive in an amount of 0.2 parts by weight based on 1 part by weight of the ion conductor.

Examples 8-2-1 to 8-2-6

0.2 parts by weight of the ion conductor manufactured according to each of Manufacturing Examples 1-1 to 1-6 and 0.04 parts by weight of a nitrogen-containing cyclic compound, such as bipyridine, as an ion-permeation preventing additive, were dissolved in 1 part by weight of DMAc to manufacture an ion conductor solution.

Subsequently, the porous support manufactured according to Manufacturing Example 2-1 was impregnated with the ion conductor solution twice for 30 minutes, was subjected to decompression for 1 hour, and was dried in a vacuum at 80° C. for 10 hours to manufacture an ion exchange membrane.

The manufactured ion exchange membrane included the ion-permeation preventing additive in an amount of 0.2 parts by weight based on 1 part by weight of the ion conductor.

Comparative Examples 8-1 to 8-6

0.2 parts by weight of the ion conductor manufactured according to each of Manufacturing Examples 1-1 to 1-6 was dissolved in 1 part by weight of DMAc to manufacture an ion conductor solution.

Subsequently, the porous support manufactured according to Manufacturing Example 2-1 was impregnated with the ion conductor solution twice for 30 minutes, was subjected to decompression for 1 hour, and was dried in a vacuum at 80° C. for 10 hours to manufacture an ion exchange membrane.

Experimental Example 3: Analysis of Vanadium Permeability of Manufactured Ion Exchange Membrane Vanadium t permeability of the ion exchange membrane manufactured according to each of Examples 5-1-1 to 8-2-6 and Comparative Examples 5-1 to 8-6 was measured, and the results are shown in Table 3 below.

The vanadium permeability was measured by hourly measuring the permeation amount of vanadium ions by means of a UV-vis spectroscopy in the state in which the membrane was disposed between a $MgSO_4$ solution and a vanadium solution.

Meanwhile, vanadium permeability of the ion exchange membrane manufactured according to Comparative Example 5-1 under the conditions in which a crown ether, such as 18-Crown-6, as an ion-permeation preventing additive, was added to the vanadium solution, rather than the ion exchange membrane, in the same amount as in Example 5-1-1 was also measured, and the result is shown in Table 3 below (Comparative Example 5-2).

TABLE 3

| | Vanadium permeability ($cm^2$/min) |
|---|---|
| Example 5-1-1 | $1.13 \times 10^{-7}$ |
| Example 6-1-1 | $1.49 \times 10^{-7}$ |
| Example 7-1-1 | $1.27 \times 10^{-7}$ |
| Example 5-2-1 | $1.52 \times 10^{-7}$ |
| Example 6-2-1 | $2.39 \times 10^{-7}$ |
| Example 7-2-1 | $2.17 \times 10^{-7}$ |
| Comparative Example 5-1 | $9.71 \times 10^{-7}$ |
| Comparative Example 5-2 | $6.33 \times 10^{-7}$ |
| Example 8-1-1 | $6.37 \times 10^{-9}$ |
| Example 8-2-1 | $8.84 \times 10^{-9}$ |
| Comparative Example 8-1 | $1.03 \times 10^{-8}$ |
| Nafion212 Commercial membrane | $2.48 \times 10^{-6}$ |

Referring to Table 3 above, it can be seen that, since the ion exchange membranes manufactured according to Examples included the ion-permeation preventing additive, they prevented the permeation of ions better than the ion exchange membranes manufactured according to Comparative Examples.

Meanwhile, it can be seen that, Comparative Example 5-2, in which the ion-permeation preventing additive was added to the vanadium solution rather than to the ion exchange membrane, showed lower vanadium permeability than Comparative Example 5-1 but showed higher vanadium permeability than Examples. The reason for this is that, in the case in which a crown ether is introduced into the vanadium solution, inhibition of permeation occurs only to the vanadium combined with the crown ether within the vanadium solution is inhibited, whereby showing relatively low permeability-reducing effect.

Experimental Example 4: Analysis of Performance of Manufactured Ion Exchange Membrane Voltage efficiency, current efficiency, and energy efficiency of the ion exchange membrane manufactured according to each of Examples 5-1-1 to 8-2-6 and Comparative Examples 5-1 to 8-6 were measured using the same method as in Experimental Example 2, and the results are shown in Table 4 below.

Meanwhile, vanadium permeability of the ion exchange membrane manufactured according to Comparative Example 5-1 was also measured under the conditions in which a crown ether (18-Crown-6) which is an ion-permeation preventing additive was added to each of the positive electrode solution and the negative electrode solution rather than to the ion exchange membrane in the same amount as in Example 5-1-1, and the results are shown in Table 4 below (Comparative Example 5-2).

In addition, after complete charging and discharging was performed five times, the volume of the positive electrode solution and the volume of the negative electrode solution were measured in order to measure the ratio thereof ($V_{cathode}/V_{anode}$), and the results are shown in Table 4 below. At the time of charging and discharging, moisture moves from the positive electrode to the negative electrode, whereby a change in volume occurs. In the case in which $VO_2^+$ permeates, moisture also permeates, whereby the ratio thereof is greatly changed. Consequently, it is possible to check the balance state of the electrolytic solution during operation based on the volumetric ratio of the positive electrode solution to the negative electrode solution ($V_{cathode}/V_{anode}$).

TABLE 4

| | Membrane thickness (μm) | Voltage efficiency (VE) | Current efficiency (CE) | Energy efficiency (EE) | $V_{cathode}/V_{anode}$ |
|---|---|---|---|---|---|
| Example 5-1-1 | 55 | 93% | 94% | 87% | 0.96 |
| Example 6-1-1 | 55 | 92% | 94% | 86% | 0.98 |
| Example 7-1-1 | 55 | 92% | 94% | 86% | 0.97 |
| Example 5-2-1 | 55 | 92% | 93% | 86% | 0.98 |
| Example 6-2-1 | 55 | 92% | 93% | 86% | 0.97 |
| Example 7-2-1 | 55 | 92% | 94% | 86% | 0.98 |
| Comparative Example 5-1 | 55 | 89% | 94% | 84% | 0.90 |
| Comparative Example 5-2 | 55 | 90% | 93% | 85% | 0.93 |
| Example 8-1-1 | 55 | 91% | 94% | 86% | 0.97 |
| Example 8-2-1 | 55 | 90% | 93% | 84% | 0.98 |
| Comparative Example 8-1 | 55 | 89% | 94% | 84% | 0.94 |
| Nafion212 Commercial membrane | 25 | 87% | 94% | 82% | 0.88 |

Referring to Table 4 above, it can be seen that, since the ion exchange membranes manufactured according to Examples included the ion-permeation preventing additive, they prevented the permeation of ions better than the ion exchange membranes manufactured according to Comparative Examples, whereby improving voltage efficiency and inhibiting degradation.

Also, in the case in which the crown ether-based ion-permeation preventing additive is applied to the single-membrane type ion exchange membrane, as in Example 5-1-1, imbalance of the electrolytic solution during operation may occur due to a change in volumetric ratio of the positive electrode solution to the negative electrode solution, whereby battery operation efficiency may be reduced. However, it can be seen that, in the case in which the crown ether-based ion-permeation preventing additive is applied to the ion exchange membrane in the form of a coating layer or a stacked layer, as in Example 6-1-1 and Example 7-1-1, such imbalance of the electrolytic solution during operation does not occur.

Although the preferred embodiments of the present disclosure have been described above, the scope of the present disclosure is not limited thereto, and various modifications and improvements made by those skilled in the art using the basic concept of the present disclosure defined in the accompanying claims fall within the scope of the present disclosure.

DESCRIPTION OF REFERENCE SYMBOLS

- 104: Ion exchange membrane
- 10: First polymer membrane
- 11: First ion conductor
- 20: Second polymer membrane
- 21: Second ion conductor
- 22: Columnar porous metal oxide
- 23: Ion-capturing additive
- 102: Cell housing
- 102A: Positive electrode cell 102B: Negative electrode cell
- 104: Ion exchange membrane
- 106: Positive electrode
- 108: Negative electrode
- 110: Positive electrode electrolyte storage tank
- 112: Negative electrode electrolyte storage tank
- 114, 116: Pumps
- 118: Power supply/Load

INDUSTRIAL APPLICABILITY

The present disclosure relates to an ion exchange membrane and an energy storage device including the same, wherein the energy storage device may be, for example, a redox flow battery, specifically an all-vanadium redox battery.

An additive capable of limiting the size of a channel through which ions permeate or capturing ions on a path along which the ions move is introduced into the ion exchange membrane, whereby permeation of the ions is prevented, and therefore voltage efficiency is improved and degradation is prevented.

The invention claimed is:

1. An energy storage device comprising a first electrode, a second electrode, and an ion exchange membrane between the first and second electrodes, wherein the ion exchange membrane comprises:
   a polymer membrane comprising an ion conductor having a cation-conducting group or an anion-conducting group; and
   an ion-permeation preventing additive dispersed in the polymer membrane in the state of being mixed with the ion conductor,
   wherein the ion-permeation preventing additive is a columnar porous metal oxide.

2. The energy storage device according to claim 1, wherein the columnar porous metal oxide is a porous metal oxide having a columnar shape and comprising a plurality of pores extending in a height direction of the column and penetrating the column.

3. The energy storage device according to claim 1, wherein the columnar porous metal oxide has a pore size of 0.35 nm to 1.2 nm.

4. The energy storage device according to claim 1, wherein the columnar porous metal oxide has a height of 3 nm to 200 nm.

5. The energy storage device according to claim 1, wherein the columnar porous metal oxide has an aspect ratio of 1:0.1 to 1:1.

6. The energy storage device according to claim 1, wherein the columnar porous metal oxide is any one selected from the group consisting of silica, organic silica, a metal oxide other than silica, and a complex of silica and a metal oxide other than silica.

7. The energy storage device according to claim 1, wherein the columnar porous metal oxide has a hexagonal prismatic shape in which a plurality of pores is arranged in a hexagonal shape when viewed in a sectional view in a direction perpendicular to a height direction of the column.

8. The energy storage device according to claim 7, wherein the porous metal oxide of hexagonal prismatic shape has a hexagonal electron diffraction pattern, a $d_{100}$ value of which is 18 Å or more, and has a benzene adsorption capacity (@ 50 torr, 25° C.) of 15 g/100 g (grams of benzene/grams of porous metal oxide) or more.

9. The energy storage device according to claim 1, wherein the ion exchange membrane comprises the columnar porous metal oxide in an amount of 0.01 parts by weight to 0.50 parts by weight based on 1 part by weight of the ion conductor.

10. The energy storage device according to claim 1, further comprising at least one crown ether dispersed in the polymer membrane, the at least one crown ether being selected from the group consisting of 12-crown-4, 15-crown-5, 18-crown-6, dibenzo-18-crown-6, and diaza-18-crown-6.

11. The energy storage device according to claim 1, further comprising at least one nitrogen-containing cyclic compound dispersed in the polymer membrane, the at least one nitrogen-containing cyclic compound being selected from the group consisting of pyrrole, thiazole, isothiazole, oxazole, isoxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine, and indoline.

12. The energy storage device according to claim 11, wherein the ion exchange membrane comprises the at least one nitrogen-containing cyclic compound in an amount of 0.001 parts by weight to 0.20 parts by weight based on 1 part by weight of the ion conductor.

13. The energy storage device according to claim 1, wherein the ion exchange membrane comprises:
   the polymer membrane including the ion conductor; and
   a coating layer located on one surface or opposite surfaces of the polymer membrane, the coating layer comprising the ion-permeation preventing additive.

14. The energy storage device according to claim 13, wherein the coating layer comprising the ion-permeation preventing additive is provided in an amount of 0.05 parts by volume to 1.0 part by volume based on 1 part by volume of the polymer membrane.

15. The energy storage device according to claim 1, wherein the ion exchange membrane is a stack of first and second polymer membranes, the first polymer membrane comprising the ion conductor, the second polymer membrane comprising the ion conductor and the ion-permeation preventing additive dispersed therein in a state of being mixed with the ion conductor.

16. The energy storage device according to claim 15, wherein the second polymer membrane is provided in an amount of 0.05 parts by volume to 1.0 part by volume based on 1 part by volume of the first polymer membrane.

17. The energy storage device according to claim 1, wherein the polymer membrane comprises:
   a porous support comprising a plurality of pores; and
   an ion conductor filling the pores of the porous support.

18. The energy storage device according to claim 1, wherein the energy storage device is a redox flow battery.

\* \* \* \* \*